Dec. 27, 1960          C. H. WILLSEY          2,966,184
                     EGG BREAKING MACHINE
Filed Oct. 2, 1956                          12 Sheets-Sheet 4
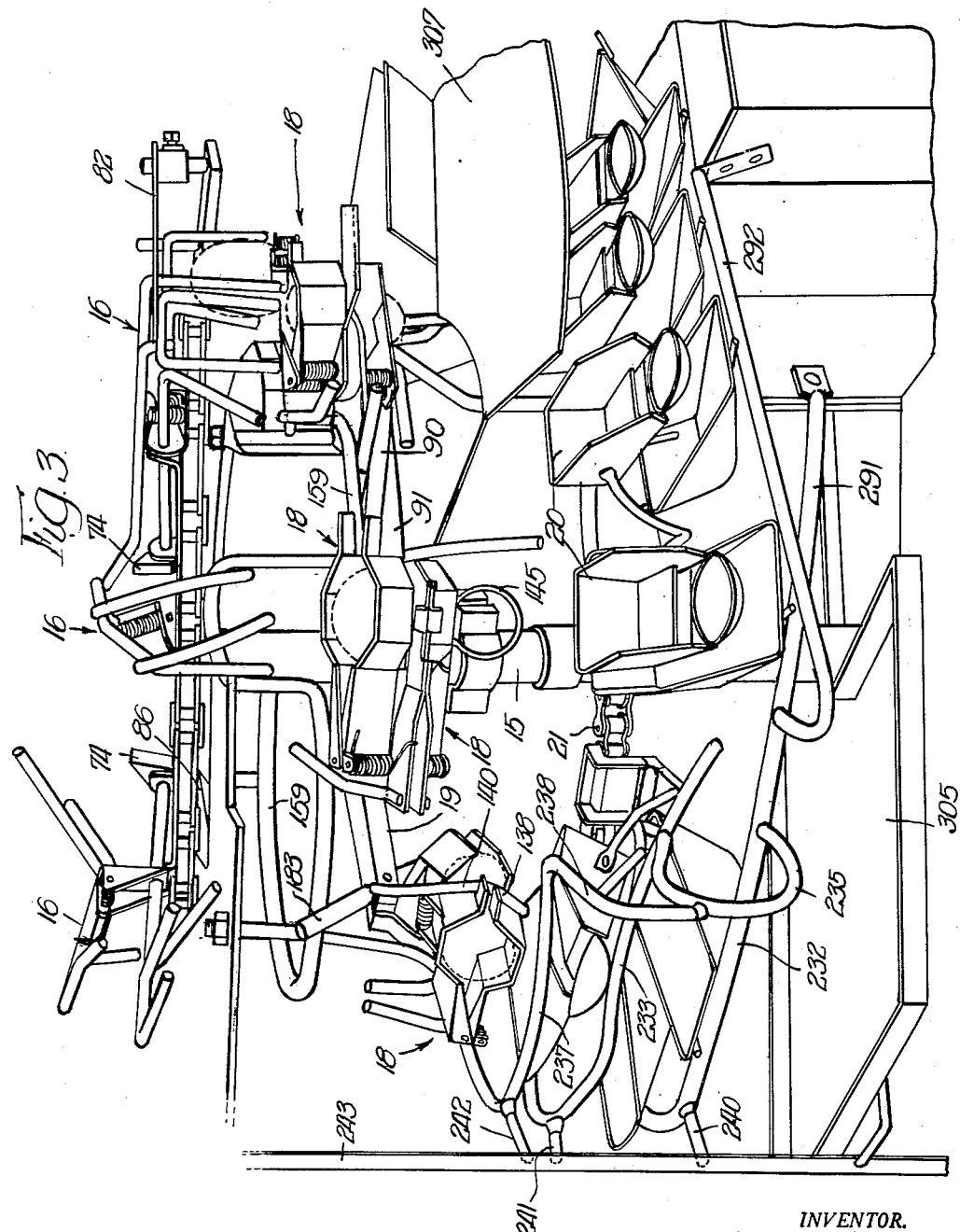
INVENTOR.
Charles H. Willsey
BY
Cromwell, Greist & Warden
Attys.

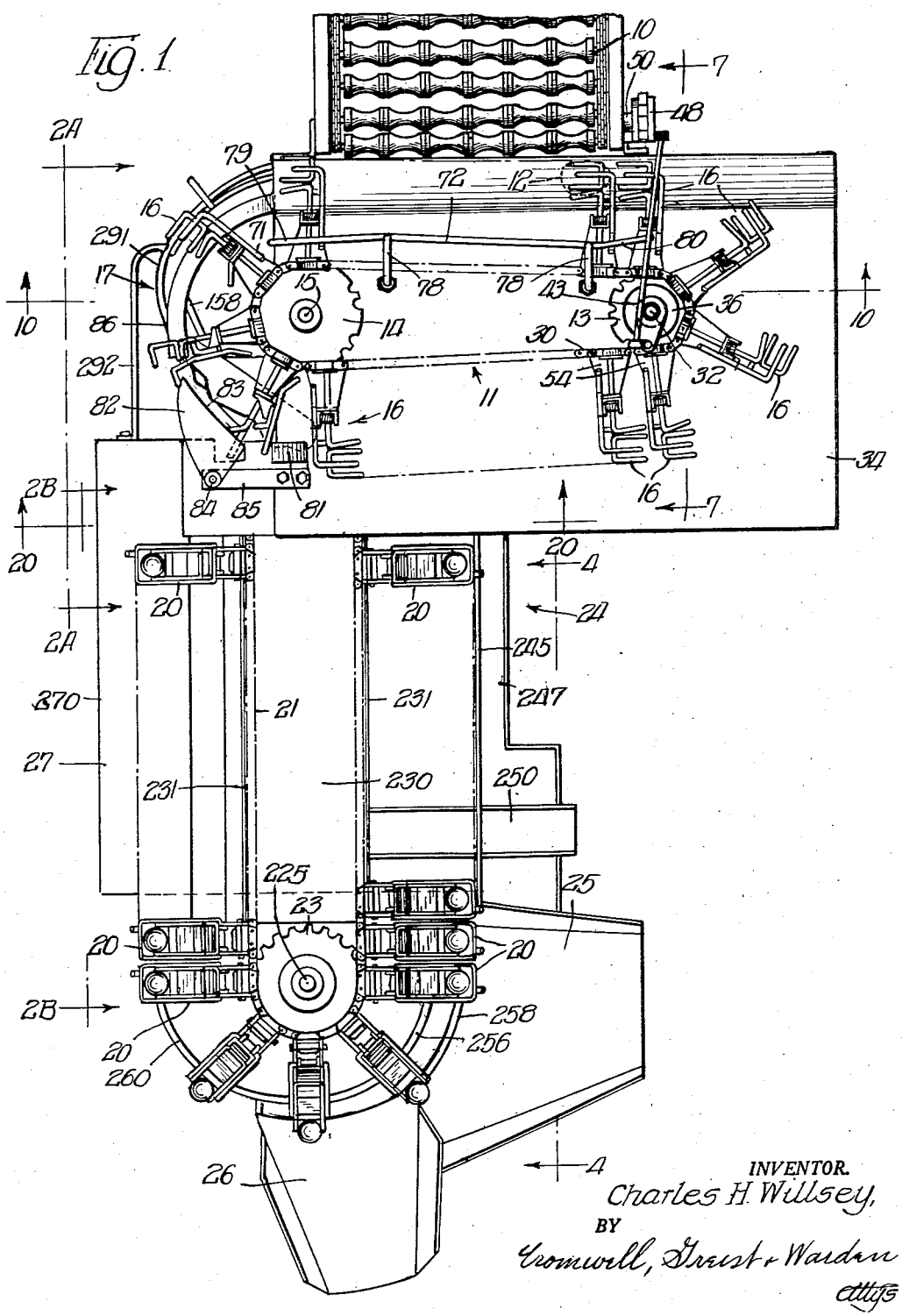

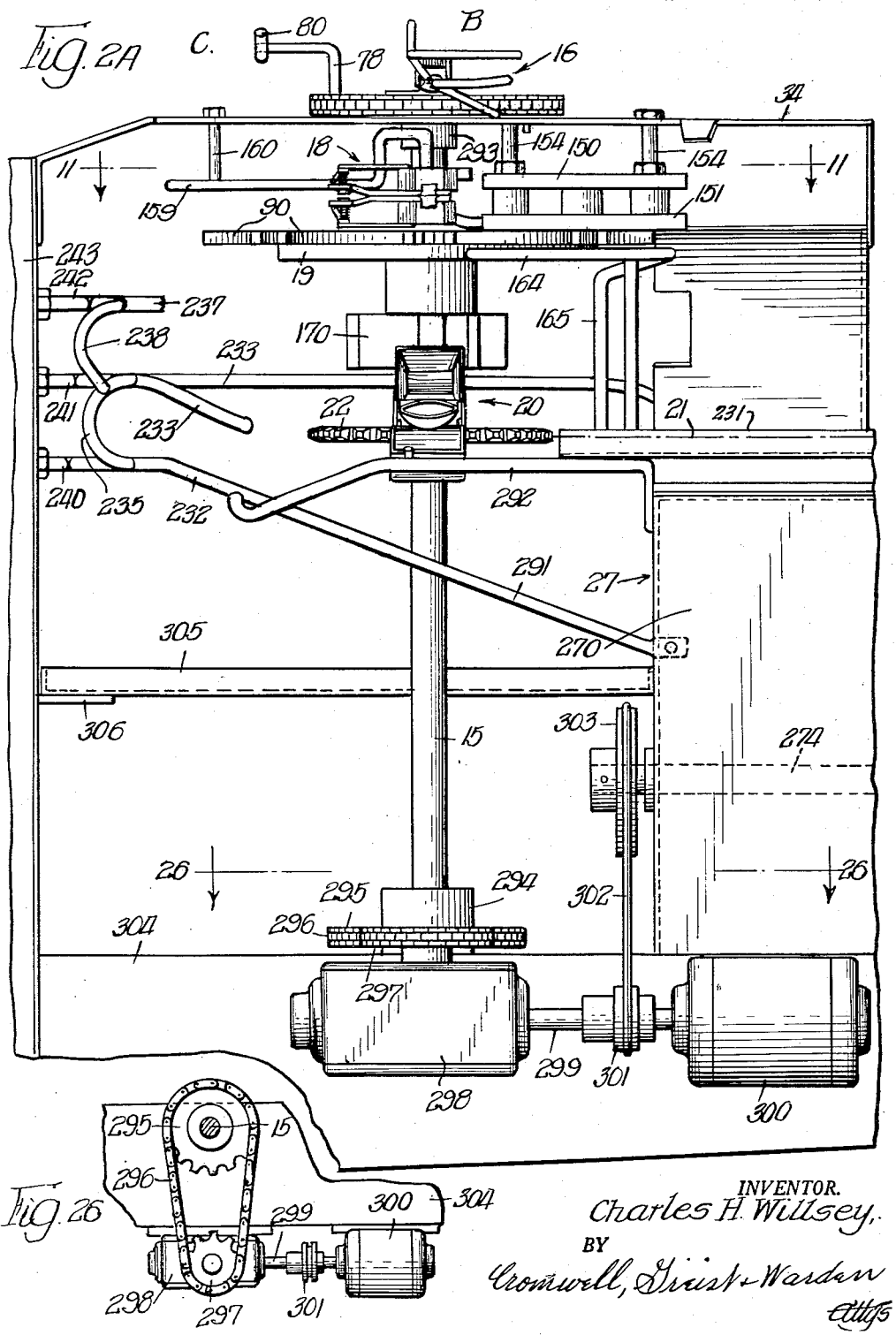

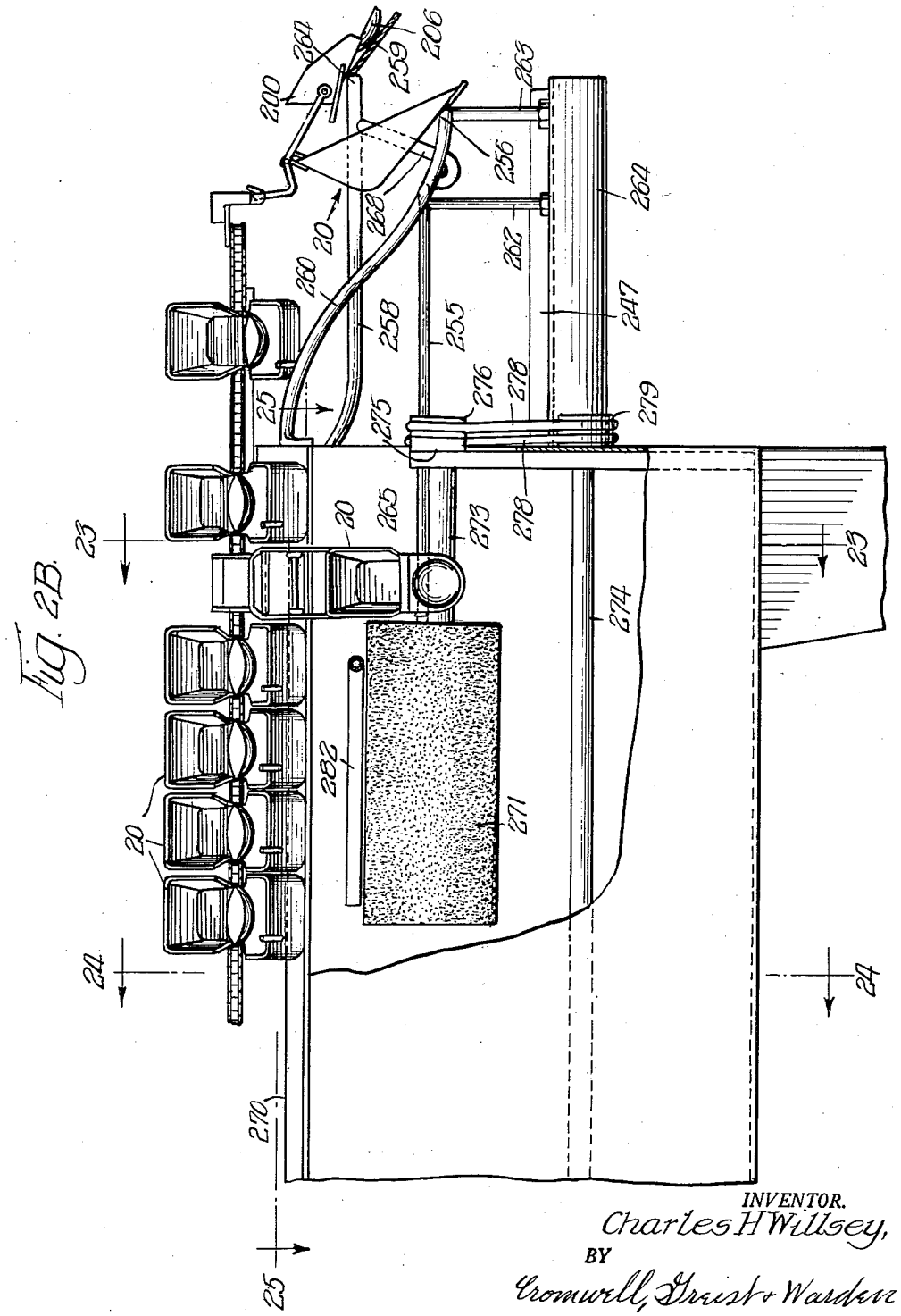

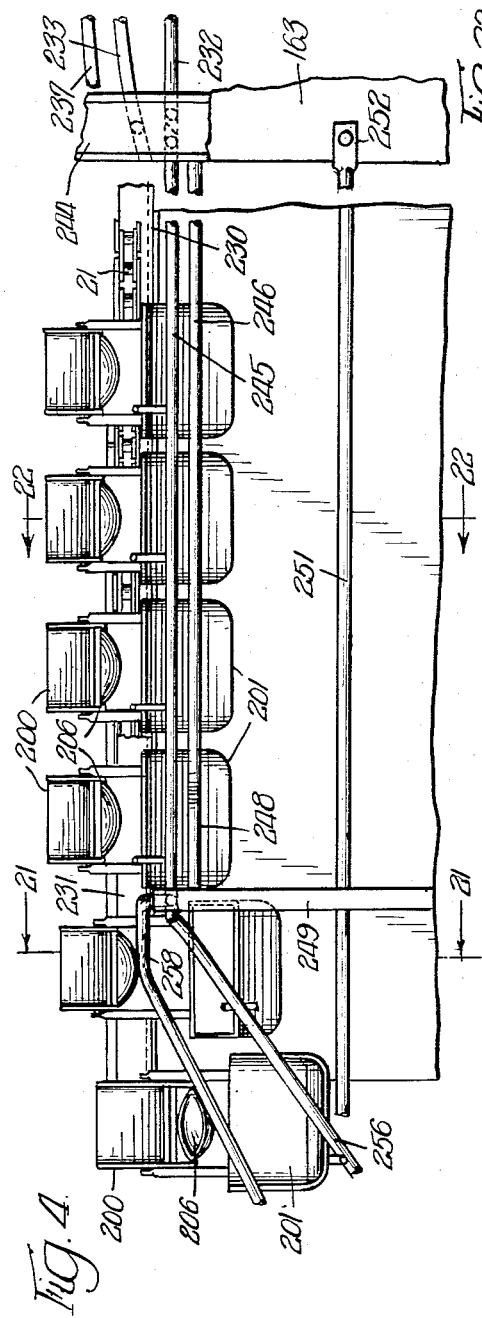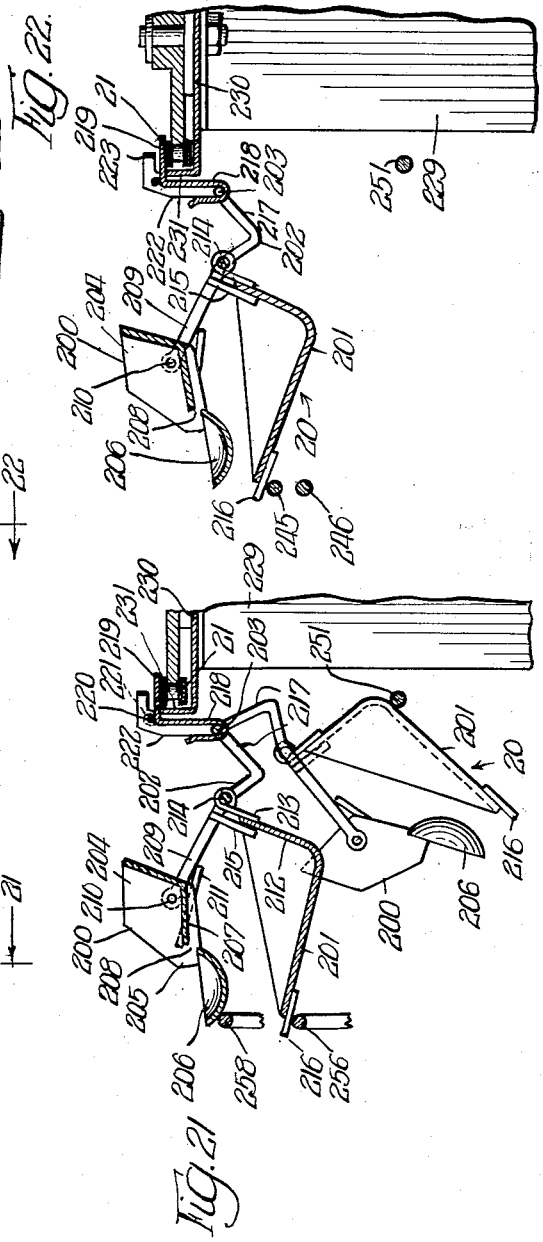

Dec. 27, 1960   C. H. WILLSEY   2,966,184
EGG BREAKING MACHINE
Filed Oct. 2, 1956   12 Sheets-Sheet 6
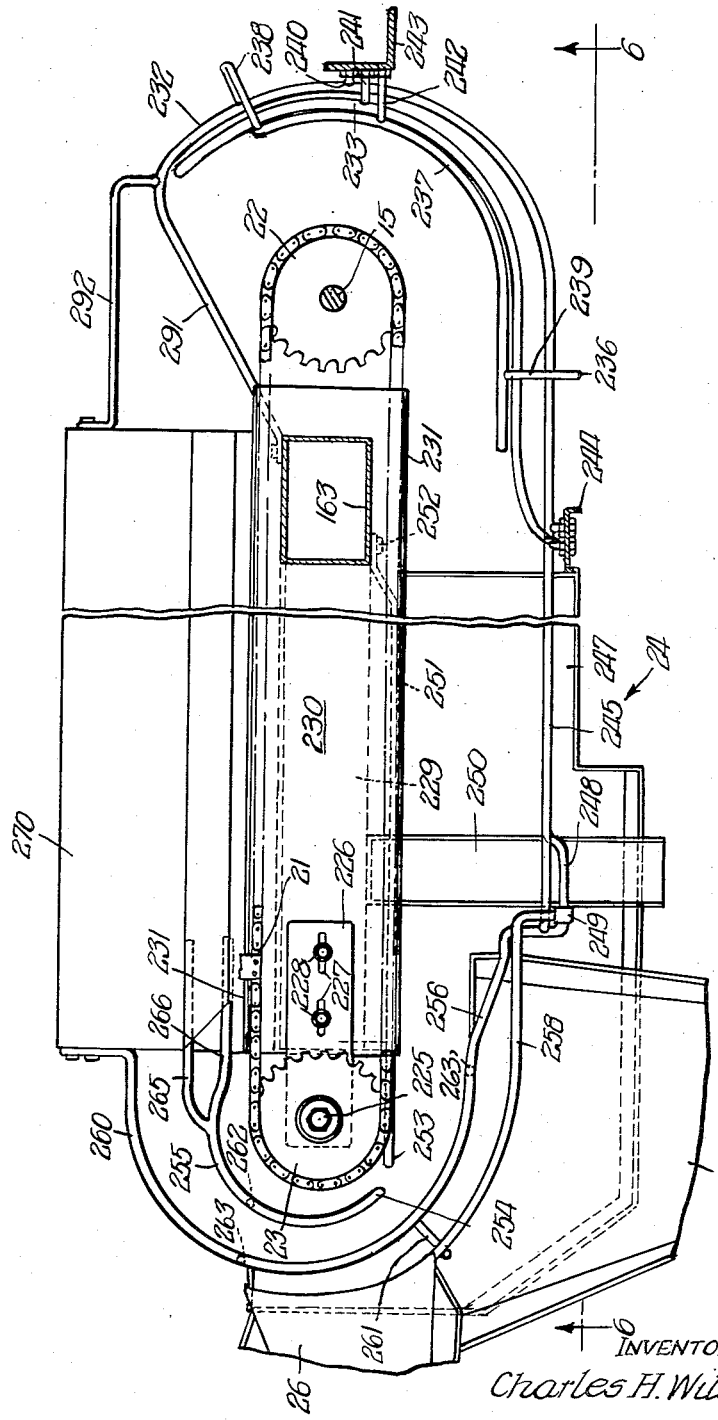
INVENTOR:
Charles H. Willsey
By Cromwell Greist + Warden
Attys.

Dec. 27, 1960 C. H. WILLSEY 2,966,184
EGG BREAKING MACHINE
Filed Oct. 2, 1956 12 Sheets-Sheet 7
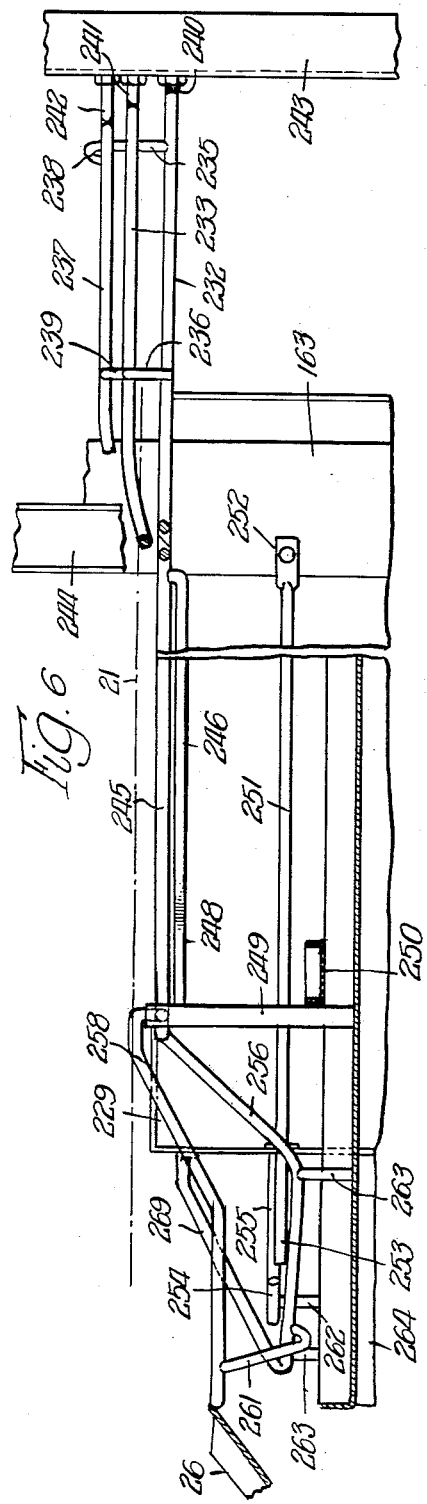
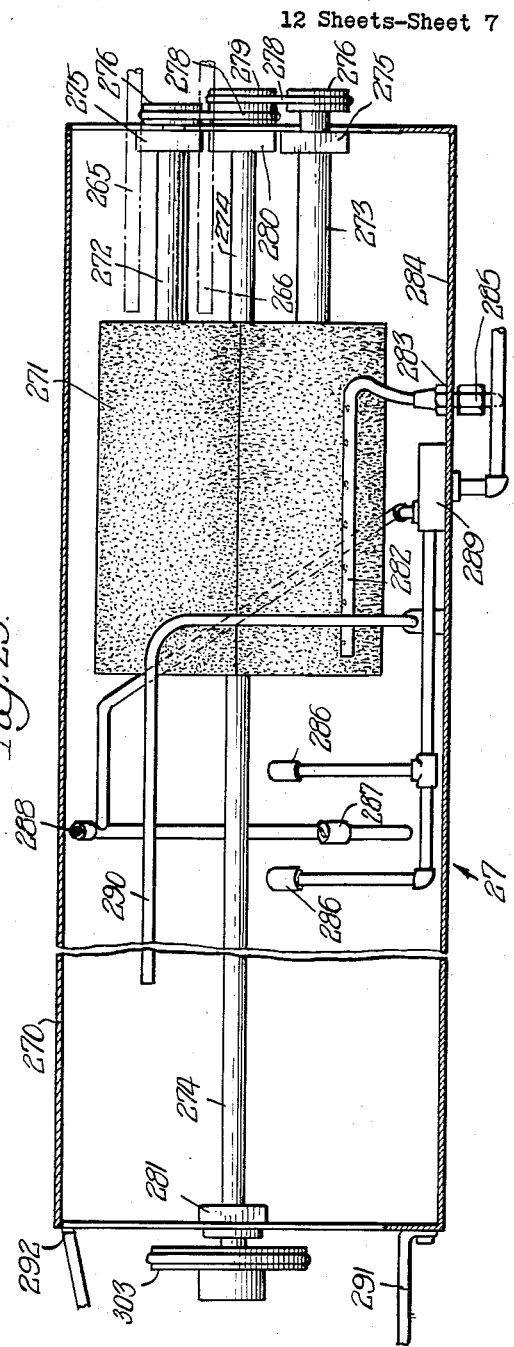
INVENTOR.
Charles H. Willsey,
BY
Cromwell, Greist + Warden
Attys Dec. 27, 1960 C. H. WILLSEY 2,966,184
EGG BREAKING MACHINE
Filed Oct. 2, 1956 12 Sheets-Sheet 8
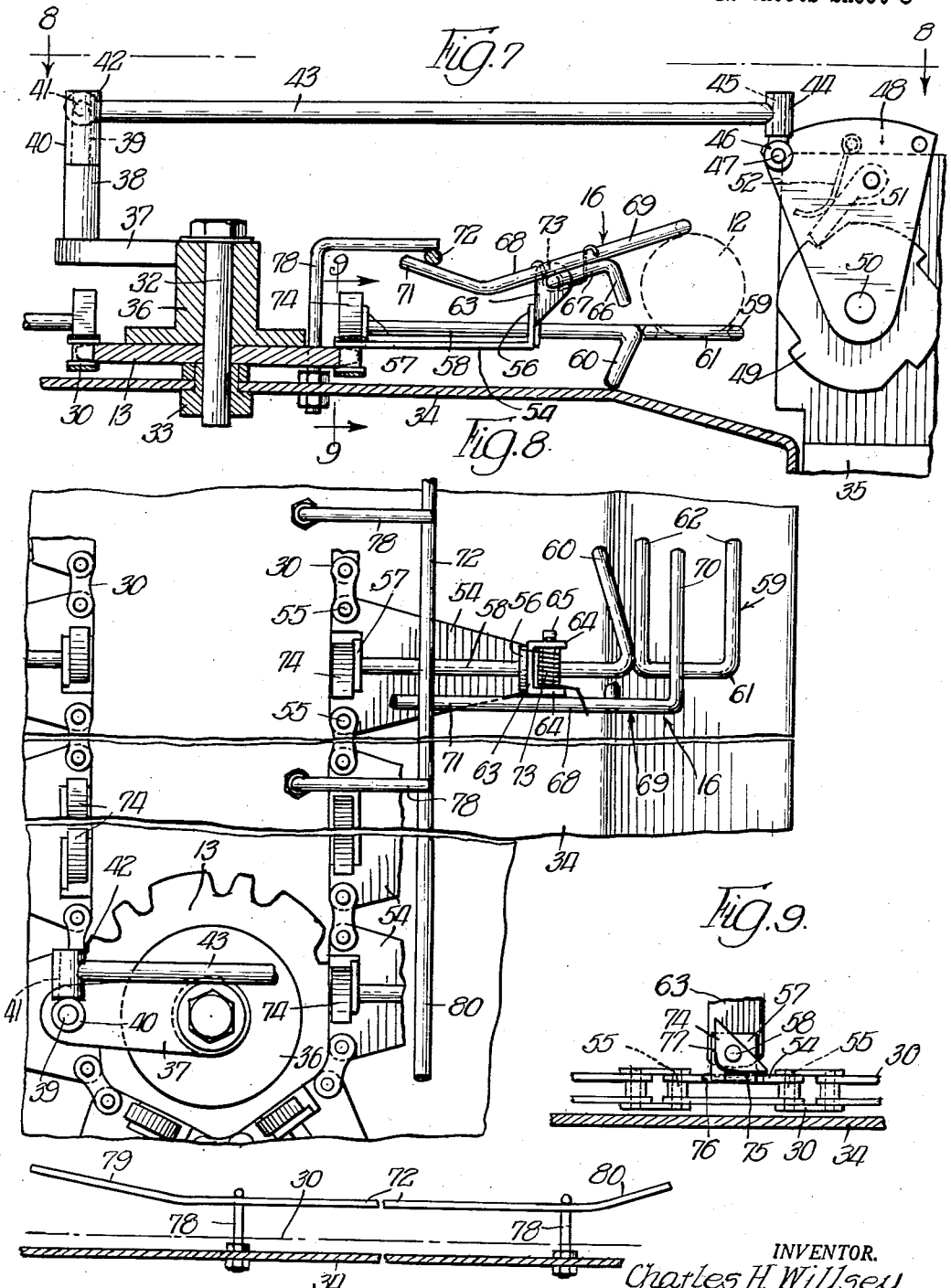
INVENTOR.
Charles H. Willsey
BY
Cromwell, Greist & Warden
ATTYS.

Dec. 27, 1960

C. H. WILLSEY 2,966,184

EGG BREAKING MACHINE

Filed Oct. 2, 1956

INVENTOR.
Charles H. Willsey,
BY
Cromwell, Greist & Warden
Attys

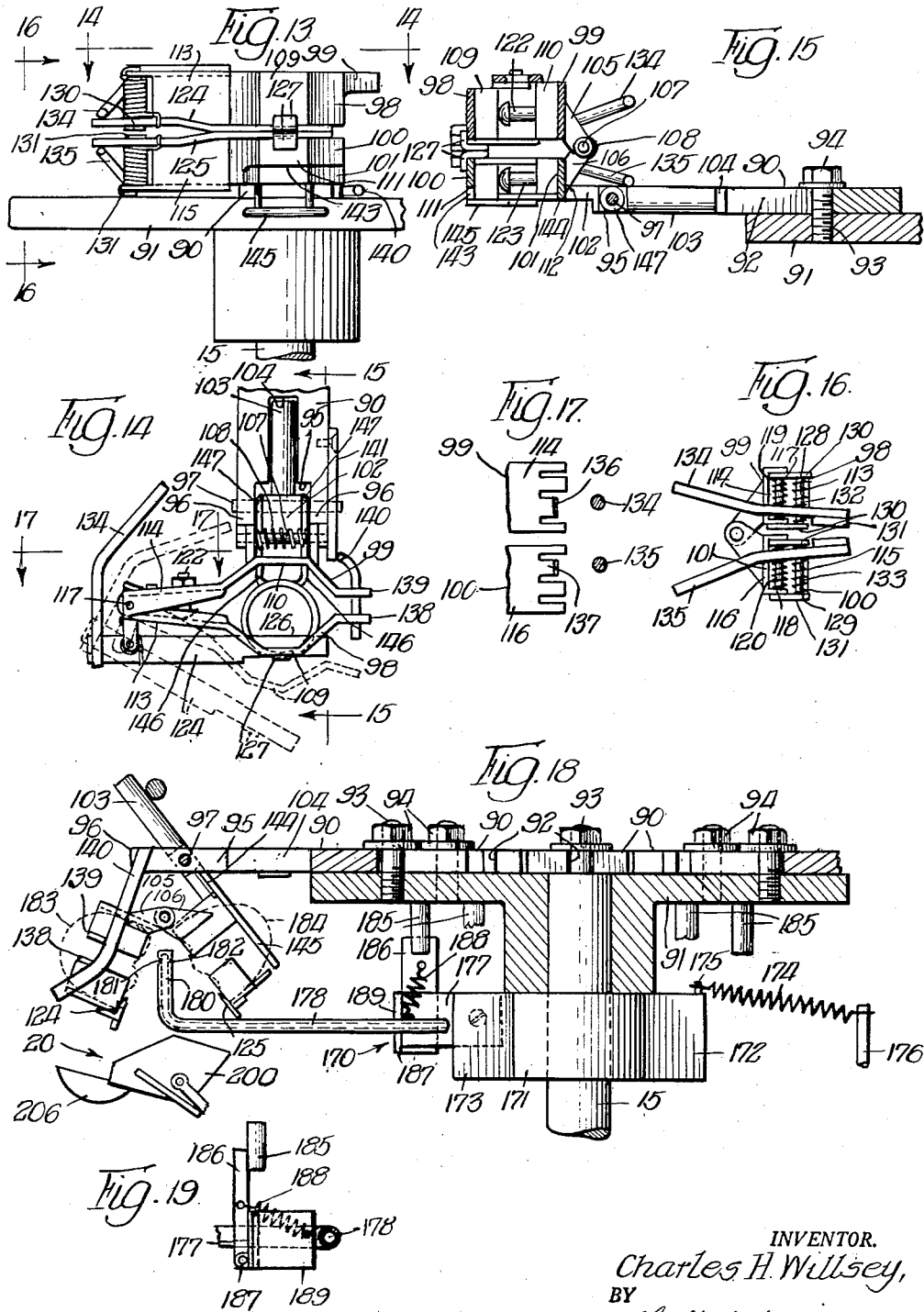

Dec. 27, 1960  C. H. WILLSEY  2,966,184
EGG BREAKING MACHINE
Filed Oct. 2, 1956  12 Sheets-Sheet 11

INVENTOR.
Charles H Willsey,
BY
Cromwell, Greist & Warden
attys

Dec. 27, 1960 C. H. WILLSEY 2,966,184
EGG BREAKING MACHINE
Filed Oct. 2, 1956 12 Sheets-Sheet 12
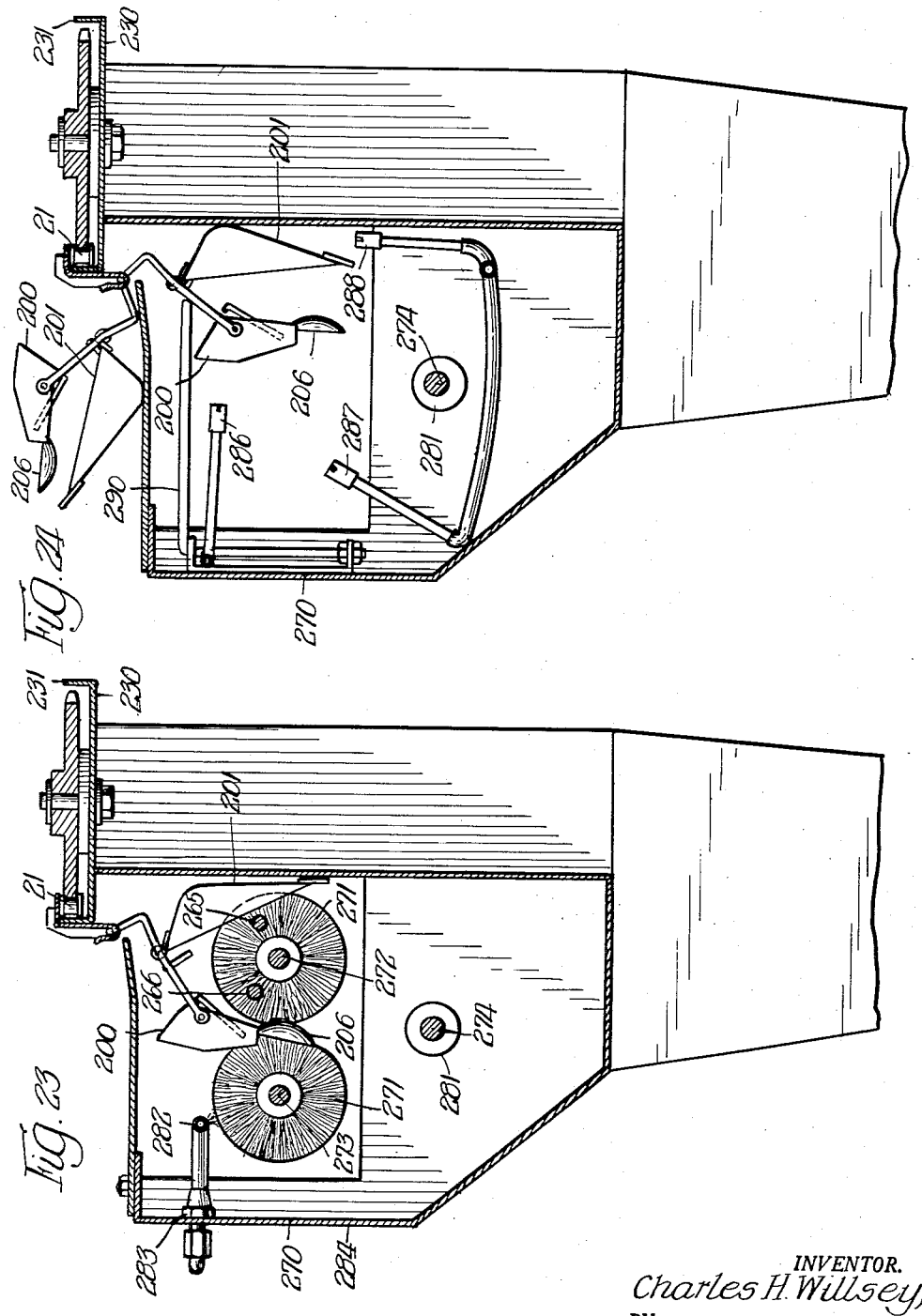
INVENTOR.
Charles H. Willsey,
BY
Cromwell, Greist & Warden
attys.

United States Patent Office 2,966,184
Patented Dec. 27, 1960

2,966,184

EGG BREAKING MACHINE

Charles H. Willsey, 1717 E. 37th St., Topeka, Kans.

Filed Oct. 2, 1956, Ser. No. 613,498

15 Claims. (Cl. 146—2)

This invention relates to egg handling apparatus and is more particularly concerned with improvements in a machine having mechanism for cracking or breaking successive eggs and separating the broken shell portions to deliver the contents therefrom together with cooperating mechanism for receiving the egg contents and for separating the yolks from the whites.

Machines have heretofore been proposed for breaking or cracking eggs, separating the broken or cracked shell into two portions, removing the contents from the separated shell portions, and separating the whites from the yolks, but these machines have not been entirely satisfactory because in most cases they have not operated to provide maximum separation of the whites from the yolks with the minimum of breakage and at sufficiently high operating speeds.

It is a general object of the present invention to provide an improved egg cracking machine having mechanism for advancing successive eggs to a cracking conveyor, mechanism carried by the conveyor for automatically cracking or breaking the shells of the successive eggs and delivering the contents thereof from the broken shells to successive receptacles which are carried on a separating conveyor, with the latter having associated therewith mechanism for advancing the successive receptacles while simultaneously separating the yolks from the whites, and with adequate provisions for handling the eggs rapidly and efficiently and for maintaining the machine and the product thereof in a sanitary condition.

It is a more specific object of the invention to provide a machine wherein successive eggs are delivered on end to cracking assemblies which are spaced about the periphery of a rotating frame, the cracking assemblies are advanced by rotation of the frame while gripping the eggs at both ends, the shell of each egg is cracked and separated into two portions which are moved apart by a hinging movement of the assembly members thereby to discharge or dump the contents into separating receptacles carried on a chain conveyor having one end supported for movement of the egg receiving receptacles in a path beneath the cracking assemblies and wherein mechanism is associated with the receptacles for separating the yolks from the whites and for discharging the same into separate receiving trays or containers.

It is another object of the invention to provide in an egg cracking machine an endless conveyor having a plurality of egg carrying devices thereon, a rotary frame at one end of the conveyor having a plurality of cracking assemblies carried on the periphery thereof which are arranged to receive the eggs from the carrying devices, and which grasp each egg at opposite ends as the conveyor moves into alignment with the rotary frame, the cracking assemblies having pivoted cracking knives thereon, mechanism associated with the cracking assemblies for operating the knives to strike and break the shells of successive eggs after they are received by the cracking assemblies, and mechanism operating the cracking assemblies to open up the shells into separate portions thereby to discharge or dump the contents into separating mechanisms positioned beneath the rotary frame.

It is a further object of the invention to provide in an egg cracking machine an endless conveyor having a plurality of egg gripping devices thereon, a rotary frame mounted beneath one end of the endless conveyor having a plurality of egg cracking assemblies arranged thereon so that they move into vertical alignment with egg gripping devices on the endless conveyor as they advance beneath the latter, whereby successive eggs are delivered to the cracking assemblies as the conveyor and frame advance in timed relation, the cracking assemblies having shell cracking knives and mechanism for actuating the knives to strike and break the shells of successive eggs as the cracking assemblies advance, and the cracking assemblies also having mechanism to turn and simultaneously open the same while they are advancing whereby the shells are divided into separate portions and the contents are discharged or dumped into separating devices which are moved into aligned relation beneath the cracking assemblies to receive the same.

It is another object of the invention to provide in an egg cracking machine a transfer mechanism for delivering a plurality of eggs which are initially arranged in row formation, from a supply conveyor to a continuously moving feed conveyor on the cracking machine, with the eggs being delivered to the feed conveyor for advancing movement thereby in single file relation.

It is a further object of the invention to provide in an egg cracking machine a cracking conveyor having a plurality of egg cracking assemblies thereon which are adapted to grip successive eggs regardless of their size, to crack the shells thereof while they advance and to rotate into a position for separation of the cracked shell portions and automatic discharge of the egg meats therefrom.

It is another object of the invention to provide in an egg cracking machine a conveyor having a plurality of cracking assemblies thereon, each of which is adapted to grasp and hold both ends of an egg, each of the cracking assemblies having a cracking knife associated therewith which is automatically positioned to crack the shell of the egg, regardless of the size of the latter, and each cracking knife having a limited movement so that it engages the shell sufficiently to break the same without breaking the yolk or otherwise disturbing the contents of the egg.

It is another object of the invention to provide in an egg cracking machine of the character described a continuously moving cracking conveyor having a plurality of cracking assemblies pivoted thereon with each of the cracking assemblies being adapted to receive an egg with its long axis extending in the vertical direction and a cooperating continuously moving conveyor having a plurality of separating devices thereon for receiving the egg contents from the cracking assemblies, the latter being operated to engage the ends of the eggs received therein and after the eggs are cracked to pivot to a position where the eggs are held with the long axis in a horizontal direction above the separating devices so that when the assemblies are opened to separate the shell portions and release the contents for gravity discharge into the separating devices the distance the contents falls is relatively small.

It is a further object of the invention to provide in an egg cracking machine of the type described a continuously moving egg delivery conveyor operating in a horizontal plane with one end of the conveyor carried on a sprocket supported on a vertical shaft, an egg contents separating conveyor arranged in spaced relation below the egg delivery conveyor with one end thereof carried on a sprocket on the same vertical shaft and having a series of egg separating receptacles carried thereon, and a plurality of egg cracking assemblies mounted on a turret forming member on the vertical shaft in the space between the sprockets supporting the ends of the egg delivery and egg separating conveyors, the cracking assemblies being arranged around the periphery of the supporting turret member in pivoted relation thereon and having pivotally connected pairs of gripper members adapted to receive the eggs one by one from the delivery conveyor with the long axis of the egg arranged vertically, and cracking knives on the cracking assemblies which are operated to crack the shells of the eggs while the cracking assemblies are pivoted to bring the long axis of the egg into a generally horizontal plane, the cracking assemblies being thereafter opened up to dump the egg meats into the egg separating receptacles carried on the conveyor below the same.

It is another object of the invention to provide in an egg cracking machine of the type described a conveyor having removably mounted thereon a plurality of separating cup assemblies for receiving the contents of the eggs as they are broken and the shell portions are separated wherein the cup assemblies comprise a lower white receiving pan and a pivotally connected upper tray which has at its outer edge a yolk cup separated from the remainder thereof by a clearance slot permitting the white of an egg received therein to drain over the edges of the yolk cup when the tray is tilted to position the yolk in the cup, with the white draining into the white receiving pan beneath the same, and cam elements arranged along the path of the conveyor and engageable with the pan and the tray to control the tilting thereof whereby the whites are separated from the yolks and thereafter the pan and the tray are tilted successively to dump the contents into separate receptacles positioned to receive the same.

It is a further object of the invention to provide in a mechanism of the type described an endless conveyor moving in a horizontal plane and having mounted thereon egg contents receiving devices which comprise upper and lower pivotally connected tray members which are mounted for outboard swinging movement on the conveyor, the upper tray member being provided with a yolk cup and apertures for draining the white around the edges of the yolk cup and into the lower tray member, and supporting members along the path of the conveyor for maintaining the tray members at predetermined elevations whereby they receive the egg contents, separate the white from the yolk, and successively dump the white from the lower tray and the yolk from the upper tray.

These and other objects of the invention will be apparent from a consideration of the egg handling machine which is shown by way of illustration in the accompanying drawings wherein:

Fig. 1 is a plan view, of a machine embodying the principal features of the invention, with portions being broken away or omitted;

Figs. 2A and 2B together constitute an elevation, on a larger scale, of one side of the machine, showing the shell cracking and egg contents dumping station and the washing mechanism for the separating cup assemblies which are located on this side of the machine, with portions of the mechanism being broken away or omitted;

Fig. 3 is a perspective view, to a larger scale, of the mechanism at the shell cracking and egg contents dumping station;

Fig. 4 is a partial side elevation, taken generally on the line 4—4 of Fig. 1 and to a larger scale, showing the inspection side of the separating conveyor, which is opposite the washing mechanism.

Fig. 5 is a plan view, partially in section, taken on a horizontal plane immediately above the separating conveyor, with the separating cup assemblies being omitted and with portions broken away, the view being on an enlarged scale and showing particularly the supporting rails for the cup assemblies;

Fig. 6 is a partial elevation taken on the line 6—6 of Fig. 5 with the separating cup assemblies omitted and with portions broken away;

Fig. 7 is a cross section taken on the line 7—7 of Fig. 1, on an enlarged scale and with portions broken away;

Fig. 8 is a partial plan view, taken on the line 8—8 of Fig. 7;

Fig. 9 is a cross section taken on the line 9—9 of Fig. 7, with portions broken away;

Fig. 10 is a fragmentary section, taken on the line 10—10 of Fig. 1, to an enlarged scale and with portions broken away;

Fig. 13 is a side elevation of a cracking assembly, the view being taken on the line 13—13 of Fig. 11, and on an enlarged scale, with the cracking assembly being in the closed egg gripping position;

Fig. 14 is a plan view of the cracking assembly, the view being taken on the line 14—14 of Fig. 13;

Fig. 15 is a vertical section, taken on the line 15—15 of Fig. 14;

Fig. 16 is an end elevation of the cracking assembly, the view being taken on the line 16—16 of Fig. 13;

Fig. 17 is a fragmentary section taken on the line 17—17 of Fig. 14 and on an enlarged scale;

Fig. 18 is a section taken on the line 18—18 of Fig. 11 on an enlarged scale and with portions broken away;

Fig. 19 is a fragmentary section, taken on the line 19—19 of Fig. 11;

Fig. 21 is a cross section taken on the line 21—21 of Fig. 4;

Fig. 22 is a cross section taken on the line 22—22 of Fig. 4;

Fig. 23 is a cross section taken on the line 23—23 of Fig. 2B;

Fig. 24 is a cross section taken on the line 24—24 of Fig. 2B;

Fig. 25 is a section taken on the line 25—25 of Fig. 2B with portions broken away; and Fig. 26 is a section taken on the line 26—26 of Fig. 2A.

Figure 11:
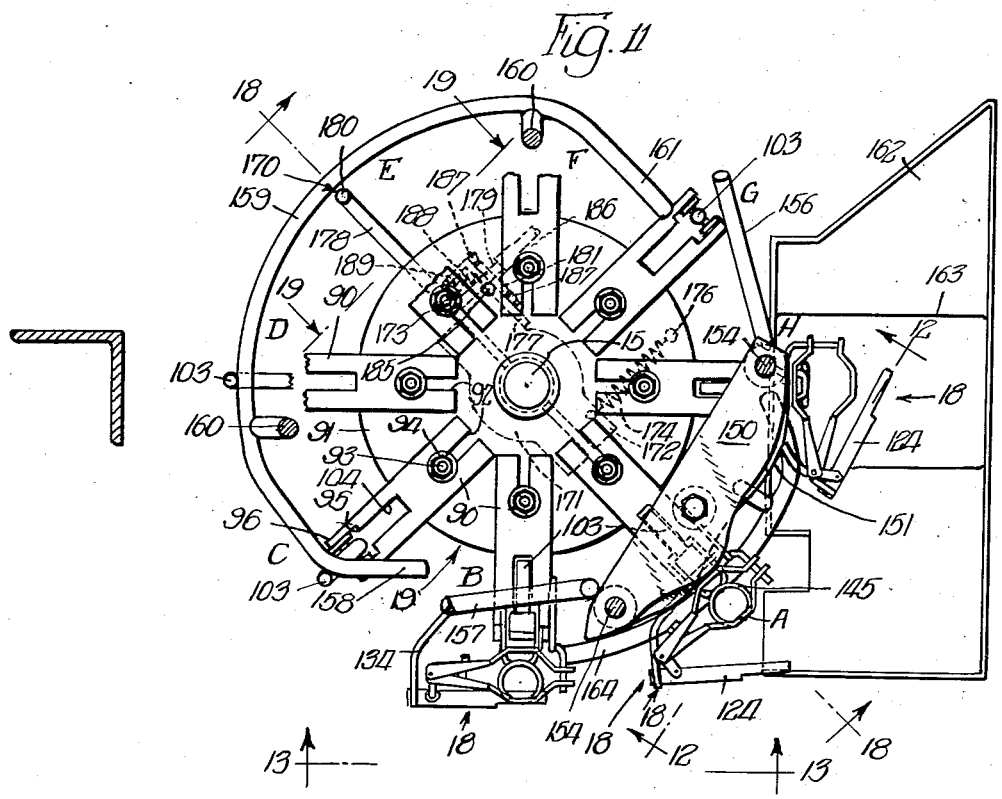
Fig. 11 is a section taken on the line 11—11 of Fig. 2A, on an enlarged scale and with portions broken away.
Figure 12:
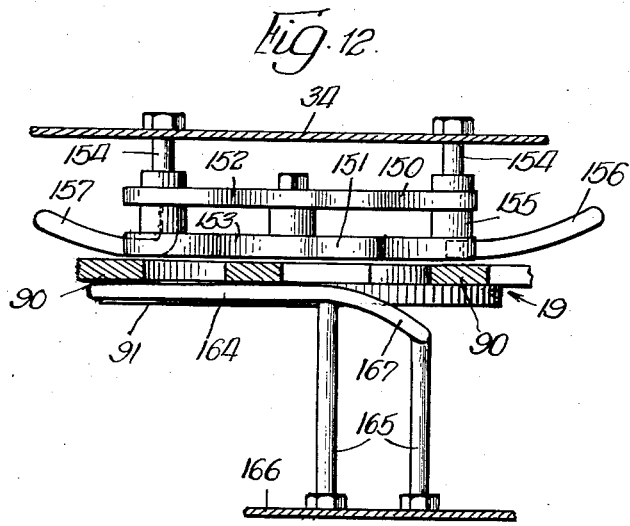
Fig. 12 is a section taken on the line 12—12 of Fig. 11 with portions broken away.

Referring particularly to Figs. 1 to 3 of the drawings, the general arrangement of the several mechanisms which are incorporated in the machine and the manner in which they cooperate in the processing of the eggs will first be described briefly. Thereafter, the separate mechanisms will be referred to with a detailed description of the structure and operation thereof.

The machine preferably includes a shell egg supply mechanism in the form of an egg washing or cleaning device having an egg supporting endless conveyor 10 with the discharge or delivery end thereof positioned to deliver successive rows of 6 eggs each to a transfer or feed conveyor 11 for the cracking and separating machine, as shown in Fig. 1. The eggs, as indicated at 12, are delivered after passage through the washer to the endless chain feed conveyor 11 which is supported at its ends for movement in a horizontal plane on the end sprockets 13 and 14, the latter being mounted on the upper end of a vertical drive shaft 15 which constitutes the main driving member for the entire machine. The chain conveyor 11 carries a plurality of egg gripping or holding assemblies 16 for receiving the eggs 12 as they are delivered in row formation by the supply conveyor 10 and for advancing the eggs 12 in single row forming relation to a point adjacent the outer periphery of the end supporting sprocket 14 where the eggs are delivered to the cracking devices at the cracking station indicated at 17.

The eggs 12 are delivered, one by one, from the holding assemblies 16 on the conveyor 11 to cracking assemblies 18 which are carried around the periphery of a circular supporting frame or plate structure 19 mounted below the end sprocket 14 on the vertical power shaft 15. The cracking assemblies 18, to which the individual eggs 12 are delivered with the long axis of the same extending vertically, are constructed to engage the periphery of each successive egg and to advance the same in a circular path around the power shaft 15. The cracking assemblies 18 are pivotally connected to the periphery of the supporting frame plate 19 and are operated as they advance to crack the egg shell and then swing downwardly, as shown in Fig. 3, to a dumping position where they open up and separate the cracked shell into two portions or halves which allows the egg contents to drop by gravity into one of a plurality of separating devices 20 which are mounted in spaced relation on an endless separating conveyor 21, the latter having one end thereof supported on an end sprocket 22 (Figs. 2A and 5) secured on the vertical power shaft 15 below the cracking head frame 19. The conveyor 21, which is arranged in a generally horizontal plane, has its other end supported on an idler sprocket 23 and the movement of the same is timed to align the separating devices 20 below the cracking assemblies 18 as they pass around the end sprocket 22. The separating devices 20 are advanced by conveyor 21 past an operator at an inspection station indicated at 24 in Fig. 1, and the yolks and whites are separated by manipulation of the separating devices 20. Thereafter the yolks and whites are delivered separately to chutes 25 and 26 and thence to collecting receptacles (not shown) for removal from the machine. Provision is made for dumping the contents, prior to separation of the yolks and whites, of any of the separating devices 20 into which the inspector finds a spoiled or inedible egg has been delivered or in which the yolk has been broken. A washing machine 27 is arranged along the return run of the conveyor 21 for cleaning and sterilizing the separating devices 20 from which broken yolks or spoiled egg meats have been removed.

The conveyor 10 of the shell egg washing machine is arranged for movement of its upper run in a generally horizontal plane slightly above the plane of operation of the horizontal feed or transfer conveyor 11 of the cracking machine so that each line of eggs 12 is delivered over the end of the conveyor 10 and received in spaced relation in the gripper assemblies 16 on the conveyor 11. The conveyor 11 (Figs. 1, 3, 7 and 8) comprises an endless chain 30 which is carried on driven sprocket 14 and the idler sprocket 13. The sprocket 13 is secured on an upstanding stub shaft 32 which is journalled in a suitable bearing 33 mounted on the horizontal support plate 34, the latter forming the top of the main frame 35 of the machine. The sprocket 14 at the other end of the chain 30 is mounted on the upper end of the upright vertical power shaft 15. The sprocket 13 carries on its uppermost face a hub formation 36 to the upper end of which there is secured a radial arm 37 having at its outer end an upstanding post 38 with a reduced portion 39 at its upper end on which a vertical sleeve 40 is rotatably mounted. The sleeve 40 has a laterally extending pivot pin 41 which is received in the bore of the cross head 42 at the end of a pitman 43. At the other end the pitman 43 receives in the bore of the cross head 44 a pin 45 extending upwardly of a sleeve 46 which is mounted on a pin 47 extending laterally of a triangular shaped double plate bracket 48 which straddles a toothed wheel 49 secured on the end of a cross shaft 50 which supports one end of the conveyor 10. The frame-like bracket 48 is pivotally mounted on the end of the shaft 50 and carries a pivoted dog 51 between its side plates which is urged by its spring 52 in a direction to engage with the teeth in the wheel 49 when the bracket 48 is rotated in a counterclockwise direction by the movement of the pitman 43 to index the conveyor 10 and deliver a row of eggs 12 to the gripper assemblies 16 on the conveyor 11.

The gripper assemblies 16 are each mounted on the chain 30 by means of a generally triangular shaped support or base plate 54, which base plate is attached to the chain by pins 55 forming connecting pivots between the links of the chain. The base plate 54 is connected to the chain along a base forming edge and has an upstanding flange 56 at its outer apex forming end which cooperates with an upstanding flange or tongue member 57 at its base edge to provide bearing forming supports for a shaft-like inner arm or leg portion 58 of the bottom gripper member or clamp formation 59. The bearing support members 56 and 57 are apertured to rotatably support the shaft forming leg 58 which is integral with an outer angular end portion 60, the latter forming an angle somewhat less than 90° with the shaft portion 58 and in the normal egg receiving position, as shown in Fig. 7, extending downwardly at an angle to the horizontal so that its free end normally rests on the supporting frame plate 34. A U-shaped egg supporting member 61 is rigidly secured to the end of the shaft 58 at the juncture thereof with the outer end portion 60. The U-shaped member is positioned with its parallel legs 62 extending in the same general direction as the member 60 and is in a plane which is in angled relation with the plane of the member 60 so that in the egg receiving position, as shown in Figs. 7 and 8, it is generally parallel to the top surface of the frame plate 34, and the bent end member 60 angles downwardly therefrom in the direction of the trailing end of the member 61 for engagement with the top of the supporting plate member 34 whereby the U-shaped member 61 is supported in a horizontal plane and receives an egg 12 from the conveyor 10 with the long axis of the egg extending generally parallel to the plane of the member. The shaft forming member 58 and the associated members form the bottom jaw member of the clamping assembly 16 for holding or gripping the eggs as they are forwarded by advancing movement of the conveyor chain 30. An upstanding bracket member 63 is secured to the shaft bearing member 56 which has its upper side edges bent outwardly into spaced parallel relation to form bearing ears 64 which support a laterally extending bearing shaft pivot pin member 65. The pivot member 65 forms one end of a rod-like bracket member which is bent to form three sections of approximately equal length, the opposite end section 66 depending in a generally vertical plane extending transversely of the path of travel of the chain 30 and the center connecting section 67 being at right angles to the end sections 65 and 66 and in the same transverse planes as the respective end sections. The center section 67 is secured to an intermediate portion of one leg 68 of an L-shaped arm 69 forming the upper clamp arm of the gripper assembly 16, the other leg 70 of the clamp arm 69 extending parallel to the pivot member 65 and spaced outwardly of the latter. In the egg clamping position, as shown in Fig. 7, the outer leg 70 of the clamp arm 69 is generally parallel and spaced above the plane of the U-shaped egg supporting member 61. The leg 68 of the clamp arm or jaw member 69 terminates at its inner end in an upwardly bent portion 71 which forms a cam arm for engaging a cam bar 72 to control the swinging movement of the clamp arm 69 about its pivot 65. A torsion spring 73 is associated with the pivot member 65 and urges the clamp arm 69 in a clockwise direction, as viewed in Fig. 7, to bring the outer end 70 of the clamp arm 69 into clamping engagement with the egg 12 when the latter is positioned on the lower clamp member 61 of the gripper assembly.

Figure 20:
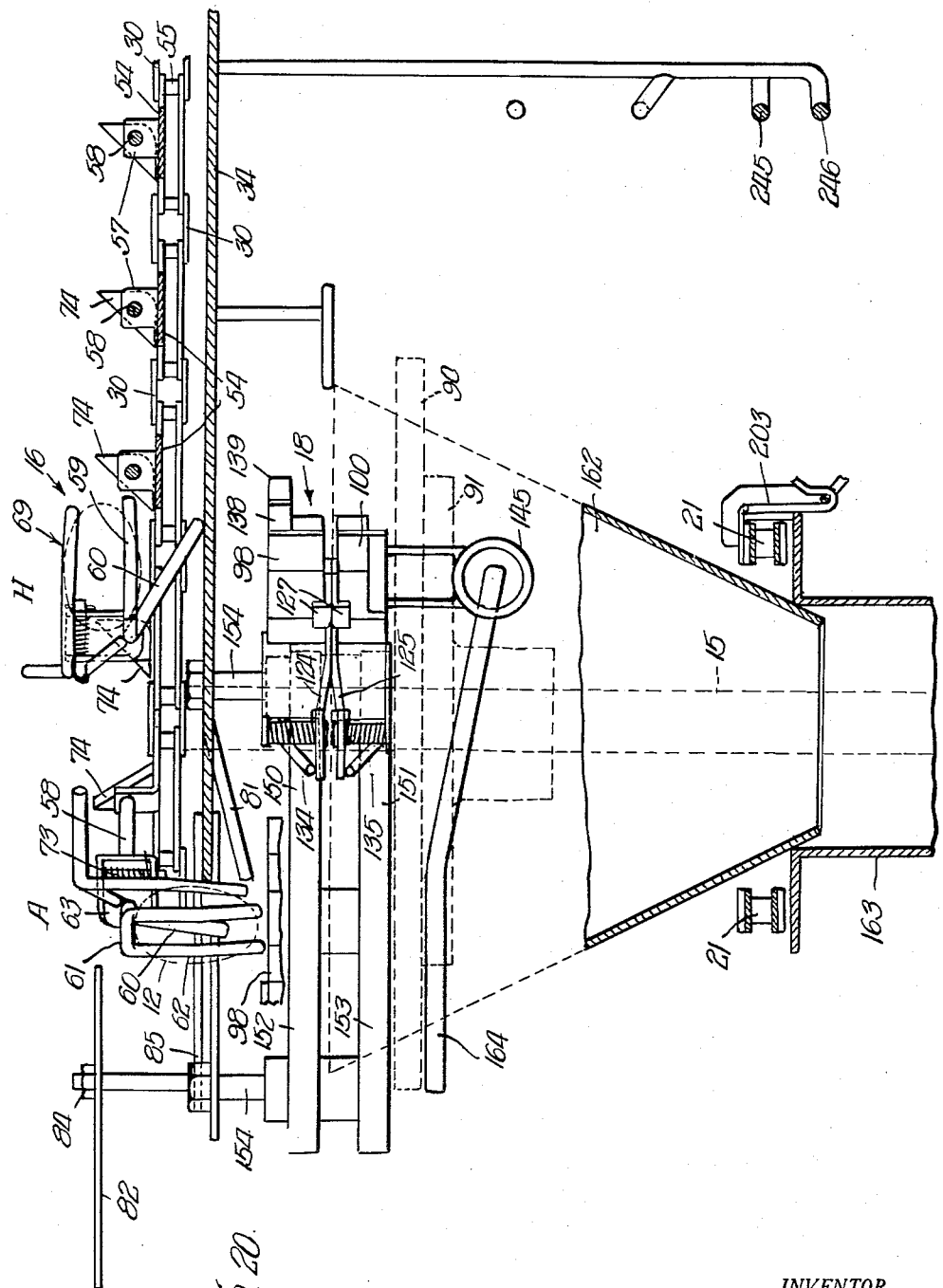
Fig. 20 is a cross section, on an enlarged scale, taken on the line 20—20 of Fig. 1 with portions broken away.

The shaft portion 58 of the lower clamp jaw 59 is provided on its inner end with a triangular shaped stop plate or block member 74 (Fig. 9). The stop block 74 is positioned above the recess 76 which is cut in the end of the supporting plate 54 in forming the upstanding flange member 57 and rotates with the arm 58. In the position shown in Fig. 7 in which the eggs 12 are received from the conveyor 10 and in which the egg supporting U-shaped member 61 is in a generally horizontal plane, the stop block member 74 has the lowermost one of its edges 75 resting at the end thereof on the top of the plate 54 adjacent the edge of the recess 76 with the adjoining edge 77 extending vertically at right angles thereto and facing in the trailing direction relative to the movement of the chain 30. The apex joining the two edges 75 and 77 is rounded on a radius which permits the shaft 58 to rotate about its longitudinal axis in its bearing supporting members 56 and 57 between two positions. In one position the edge 75 is engaged with the top of the plate 54 at one side of recess 76 and in the other the edge 77 is so engaged with the plate 54 at the other side of the recess 76, the angle of rotation of the assembly being approximately 90° in a clockwise direction as viewed from outboard of the conveyor 12. The position of the gripper assembly 16 when it is rotated is shown in Fig. 20 with the egg still being held between the U-shaped support portion 61 of the lower clamp member 59 and the arm 70 of the top clamp member 69. The opening and closing of the jaw forming members 59 and 69 of the assemblies 16 is controlled by the elongate cam bar or rail 72 which is supported above the frame plate 34 by angular upright brackets 78 spaced as shown in Fig. 1. The cam rail 72 has its ends 79 and 80 turned upwardly to engage and release the upwardly angled end portion 71 of the top clamp arm 69. The gripper assemblies 16 are, of course, held in the open position for delivery of the eggs 12 from the conveyor 10 and as each assembly 16 moves around the end sprocket 13, the cam arm 71 moves out from under the end 80 of the cam rail 72 and allows the torsion spring 73 to close the clamp arm 69 on the top of the egg 12 and hold the same firmly as the assembly 16 is advanced by the conveyor 30 to the cracking station 17 at the other end of the conveyor 30. As each gripper assembly 16 approaches the supporting sprocket 14 at the other end of the conveyor 30 it is held in a horizontal plane by engagement of the depending arm 60 with the top of the frame plate 34. As each assembly 16 moves around the sprocket 14, the arm 60 moves down a ramp-like section 81 which is formed at the end of the plate 34 (Fig. 20), the weight of the egg and the position of the same relative to the axis of the rotatably mounted shaft 58 causing the assembly 16 to rotate about the axis of the shaft 58. As the assembly 16 is advanced beyond the end of the support plate 34, it rotates through an angle of 90° so that the egg carried thereby is positioned with its long axis in the vertical direction. A jaw releasing cam plate 82 having a curved cam edge 83 is supported on a vertically extending pin 84 on a bracket 85 secured at the end of the frame plate 34. As the gripper assembly 16 continues to advance around the sprocket 14, the end portion 70 of the top clamp arm 69 is engaged by the cam edge 83 and rotated sufficiently about the pivot member 65 to open up the clamp arms or jaw members 59 and 69 and release the egg 12 for gravity delivery to one of the cracking assemblies 18 which are carried on the supporting member 19 in spaced vertically aligned relation with the gripper assemblies 16 as they move around the vertical shaft 15. Continued advance of the gripper assembly 16 allows the clamp arms to close as the upper clamp arm 69 moves free of the cam plate 82, and causes subsequent rotation of the assembly and reopening the arms of the same as the member 60 engages a curved extension 86 on the end of the frame plate 34 and the end member 71 of the top clamp arm 69 passes beneath the turned up end 79 of the cam rail 72. As the assembly 16 moves along the rear run of the conveyor chain 30 it is in proper opened up position to receive an egg 12 from the conveyor 10.

The cracking assemblies 18 (Figs. 11 to 18) are arranged in peripherally spaced relation on a turret forming plate-like structure 19 which is secured on the vertical power shaft 15, there being eight of the assemblies 18 provided on the supporting turret 19. Each of the assemblies 18 is mounted on a generally rectangular plate 90 which is clamped on a circular supporting plate member 91 attached to the shaft 15, and each plate 90 extends radially as the spokes of a wheel. Each plate 90 has its inner end slotted at 92 to fit over an upstanding clamping stud 93 on the plate 90 and is held thereon by a clamping nut 94. At its outer end the plate 90 is slotted at 95 to provide laterally spaced end bearing ears 96 which are apertured to receive a cross pin 97 for mountnig in swinging or pivoted relation thereon a cracking assembly 18. The cracking assembly 18 comprises two pairs of jaw forming members 98, 99 and 100, 101 which are arranged with the respective jaws of each pair pivotally connected by independent or separate pivots to swing on an axis which extends in a vertical plane in the position shown in Figs. 13 to 15. The innermost top and bottom jaw forming members 99 and 101 are also pivotally connected to each other to swing relative to each other about a pivot extending in a horizontal plane in Fig. 13 so that the individual jaw members of each pair may be swung toward and from each other, the pairs of jaws may be swung as units relative to each other but in a right angled direction, and the entire assembly may be swung on its support. The pivotal mounting for the entire assembly 18 comprises a block-like bracket member 102 which is secured to the inner lower jaw member 101 adjacent the lower edge thereof and which carries the cross pin 97. The pivot bearing bracket 102 has a rearwardly extending pin-like arm member 103 which forms a cam arm for controlling the swinging movement of the assembly 18 about the pivot 97. The supporting bracket plate 90 is slotted at 104 to accommodate the cam forming arm 103 when the assembly is swung to the upright radially extending egg receiving position shown in Figs. 13 to 15. The two pairs of jaw members 98, 99 and 100, 101 are pivotally connected to each other to swing about a horizontal axis by means of two pairs of laterally spaced cooperating bearing forming ears 105 and 106 which extend from the rearward faces of the respective jaw members 99 and 101 and which are connected by a pivot pin 107 on which a torsion spring 108 is mounted so that it tends to urge the pairs of jaw members into initial egg receiving or gripping position where the corresponding jaw members of each pair are in superimposed vertically aligned relation as shown in Figs. 13 and 16. The respective egg gripping jaw members 98, 99 and 100, 101 of the assembly 18 are of the same general form and each comprises a relatively narrow plate section bent to form at the outer or swinging end thereof a generally C-shaped egg gripping portion and at the other end a straight arm forming portion which has its side edge portions bent over to form laterally spaced flanges so that at their outer ends these arms or extensions are channel shaped in cross section and the flange formations thereon provide parallel oppositely disposed bearing ears for connecting pivot pins. The C-shaped gripping portions 109 and 110 of the upper pair of jaw members 98 and 99 are arranged in opposed relation (in the position shown in Figs. 13 to 16) and the gripping portions 111 and 112 of the lower jaw members 100 and 101 are likewise in opposed relation. The connecting arm portions 113 and 114 of the upper jaw members 98 and 99 are in superimposed vertically aligned relation with the corresponding portions 115 and 116 of the lower jaw members 100, 101. The arm portions have their flanges disposed in the same direction outwardly of the assembly 18 and vertical pivot pins 117 and 118 connect the outer ends of arm portions 113, 114 and 115, 116 in paired relation. The pins 117 and 118 are in vertical alignment when the cracking assembly is in the upright position shown in Fig. 14. The pivot pins 117 and 118 have associated therewith torsion springs 119 and 120 which urge the arms of each of the pairs of clamp arms 98, 99 and 100, 101 toward each other into the closed egg gripping position. Stop bolts or screws 122 and 123 are provided in the extension arm members 114 and 116 for limiting the movement of the outer arms 98 and 100 in the direction toward the opposite inner arms 99 and 101, respectively.

Shell cracking knives 124, 125 are associated with the gripper members and each of the cracking knives is provided with a blade or cutting edge portion 126 along the inner edge which extends into the egg area sufficiently to penetrate the shell of an egg positioned between the gripper portions of the gripper jaw members. Each knife has a turned over flange portion 127 along the opposite edge which engages with the outer face of the gripper jaw member to which it is pivoted and limits the movement of the knife relative to the same. The cracking knives 124 and 125 are mounted on pins 128 and 129 which are journalled in pairs of ears 130 and 131 which extend in the outward direction from the flanges on the outer clamp arms 98 and 100 opposite the connecting pivot pins 117 and 118. The pivot pins 128 and 129 have associated therewith torsion springs 132 and 133 which are arranged to urge the blade ends 126 of the knives toward the gripper portions 109 and 111 of the jaw members 98 or 100. Each of the cracker knives 124 and 125 is extended beyond its supporting pivots 128 and 129 a short distance and cam bars 134 and 135 are mounted thereon so that they extend in a generally transverse direction. The cam bars 134 and 135 are bent as shown in Figs. 14 and 16, and form part of a camming arrangement for cocking the cracking knives and releasing them for the cracking operation, the knife carrying arms 124 and 125 being moved relative to the jaw members 98 and 100 about the pivot pins 128 and 129. The cam bars 134 and 135 extend inwardly of the cracking assembly 18 and are operated in a manner which will be subsequently described. The inner gripper jaw members 99 and 101 are slotted at the ends of their arm extensions 114 and 116 to provide outwardly bent tongue members 136 and 137 which form stop lugs for the cam bars 134 and 135 and activate the outward movement of the cracking knives 124 and 125 and the outer gripper jaw members 98 and 100. The uppermost pair of gripper jaw members 98 and 99 are provided at their free ends with lug-like extensions 138 and 139 for engagement with a cam bar 140 which is secured in depending relation on a forwardly extending plate bracket 141 attached to the side of the supporting plate 90 for the gripper assembly adjacent the pivot 97 so that when the assembly 18 is pivoted a predetermined distance in a downward direction about the pin 97 the lugs 138 and 139 will engage the bar 140 and hold the upper pair of gripper arms 98 and 99 against further downward movement while the lower pair of gripper arms 100 and 101 are moved by rotation thereof about the pivot 97 to swing the two pairs of gripper jaw members into the downwardly opening position illustrated in Fig. 18 for the dumping of the contents of the broken egg. The outermost lower gripper jaw member 100 has its C-shaped outer portion 111 cut away at 143. The bracket 102 and the lower inner gripper jaw member 101 are recessed on the bottom at 144 to accommodate an egg end supporting member which is in the form of a bent length of wire having an outer section 145 of circular form and inwardly extending laterally spaced legs 146 which are provided at the inner ends with coiled bearing eye formations 147 for mounting the same in pivoted relation on the supporting pivot pin 97, the end aperture 95 being of sufficient width to accommodate the bearing forming portions 147 thereof. The wire egg support member 145 is swingable about the pivot 97 at predetermined points in the movement of the assembly 18 by engagement with cooperating cam bars which will be subsequently described.

The movement of each cracking assembly 18 about its supporting pivot 97 is controlled by cam forming bar or rail members which are arranged adjacent the turret plate 91 along the path of movement of the cam arm 103. When the assembly 18 is advanced to the egg receiving station indicated at A in Fig. 11, the entire assembly 18 is held in the vertical outwardly extending position by engagement of the cam arm 103 beneath the lowermost one of a pair of cam forming plates 150 and 151. The cam plates 150 and 151 are arranged in superimposed vertically spaced relation and have their outermost edges positioned for engagement with the operating arms or cam bars 134 and 135 for controlling the position of the cracker knives 124 and 125 and the opening movement of the gripper jaw members 98 and 100. The cam plates 150 and 151 are suspended from the top frame plate 34 by a pair of bolts 154 with the lower face of the lowermost plate 151 being immediately above the upper face of the turret plate 91 so that the lower plate 151 functions as a cam member for retaining the cam arm 103 in horizontal position while the cracker assemblies travel beneath the cam plate 151. The two cam plates 150 and 151 are separated vertically by spacer sleeves 155 and relatively short cam rail or bar members 156 and 157 are connected at the ends of the plate 151 and extend in opposite directions at an upward inclination away from the plate 151. The cam rail section 156 engages the cam arm 103 on each successive assembly 18 as the latter approaches the location of the cam plates 150 and 151. The cam rail section 157 at the other end of the plate 151 allows the successive cracking assemblies 18 to begin their downward swinging movement as they leave the egg receiving station A and advance to the succeeding stations which are indicated at B, C, D, and so forth in Fig. 11. As the assembly 18 moves between the stations indicated at B and C the egg is in vertical position but the shell has been cracked by operation of the cracking knives. The cam arm 103 moves from beneath the cam rail 157 and passes in front of the inwardly bent end 158 of a semi-circular cam rail section 159 which extends along the stations indicated at C, D, E and F. The cam rail 159 is suspended from the top plate 34 by suitable hanger brackets or bolts 160 and is located in vertically spaced relation outwardly of the path traveled by the pivots 97 so that as the cam arm 103 passes outboard of the rail 159 the entire assembly 18 is swung to the dumping position which is shown in Fig. 18 and is held in this position until it passes beyond the station indicated at F where the end 161 of the rail 159 is turned inwardly and allows the cam arm 103 to pass free of the same leaving the assembly 18 hanging in depending relation from the pivot 97 and swinging free. As the assembly 18 moves toward the shell releasing station H, the pivot arm 103 engages beneath the upturned cam rail section 156 and is moved by the same as it advances clockwise around the shaft 15 to bring the assembly into upright position for discharge or release of the broken and empty shell portions by engagement of the cam arms 134 and 135 with the cam forming edges or faces 152 and 153 of the cam plates 150 and 151. The release of the shells is accomplished at station H and the discarded shells drop into the upper funnel-like portion 162 of a discharge chute 163 positioned in depending relation below station H. At this point in the travel of the assembly 18, the egg supporting wire member 145 is held in a downwardly swung position to allow the shells to drop from the assembly. A cam rail bar 164 (Figs. 11, 12 and 20) is supported by upstanding posts 165 from a lower frame plate 166 with the downwardly curved approach end 167 thereof slightly in advance of the shell discharge station H. The cam bar 164 is positioned outwardly of the path of the pivots 97 for engagement with the leg forming portions 146 of the egg supporting wire member 145. The rail 164 curves upwardly and then extends parallel with the upper face of the turret plate 91 in position to hold the egg end support wire 145 horizontal immediately below the gripper jaws of the assembly 18. The cam rail 164 terminates slightly beyond the leading end of the cam plate 151 and the egg end support wire 145 is allowed to swing loose on the pivot 97 for the remainder of its path of travel around to the shell release station H.

While the cracking assembly is advancing in the vicinity of stations D, E and F, the remaining albumen which tends to cling to the shell portions after the major portion of the egg contents is dumped therefrom, is removed by an air mechanism indicated at 170 (Figs. 11, 18, 19 and 20). The air mechanism 170 comprises a hub-like support member 171 which is rotatably mounted on the shaft 15 immediately beneath the turret plate 91 and which has oppositely disposed radially extending arm portions 172 and 173. The support member 171 has a limited rotational movement in the clockwise direction, being urged in the counter clockwise direction by a tension spring 174 which is connected at one end 175 to the radial arm portion 172 and at the opposite end to an upstanding post 176 fixed to the main frame of the machine. At the opposite side of the supporting hub member 171 the arm portion 173 has mounted thereon a bracket plate 177 to which a relatively small tubular section 178 is attached with a coupling portion 179 projecting at the leading side of the bracket 177 and adapted to connect the same to a pressure hose which is connected to a source of compressed air. The tube 178 extends as shown in Fig. 18 to a point below the path of movement of the opened up cracking assembly 18 and has an upstanding end portion 180 which is provided with perforations 181, 182 on oppositely disposed sides at the end thereof which, in the operative position of the tube 178, direct a stream of air into each of the separated shell portions indicated at 183 and 184. The tube 178 is advanced with successive assemblies by a mechanism which comprises depending pin members 185 on the turret plate 91 and a spring held abutment plate 186 which is pivoted at 187 to bearing forming ears on the bottom edge of the bracket plate 177 and which is normally in upstanding position therefrom, being held in vertical abutting relation with the leading face of the bracket 177 by a tension spring 188 which is connected at one end to the upper portion of the plate 186 and at the other end to a flange portion 189 fixed on the outer end of the bracket plate 177. As the turret plate 91 rotates, a pin 185 which is aligned radially with the oncoming assembly 18 engages with the abutment plate 186 and rotates the entire assembly 170 about the vertical shaft 15 against the action of the spring 174. As the assembly 170 rotates in the clockwise direction, the tension in the spring 174 increases until it overcomes the tension in the spring 188 and the pin 185 snaps past the plate 186, the latter pivoting on the bracket 177 and allowing the assembly 170 to reverse its movement under the pull of the spring 174 until the trip plate 186 engages the next succeeding depending pin 185 on the turret plate 91 and the operation is repeated as the successive cracker assemblies move around the shaft 15. Air is supplied, of course, through the tube 178 and the nozzle forming head 180 thereof while the tube is traveling with the assembly 18 to force the remaining albumen out of the shell portions which are carried by the two halves of the assembly 18. The albumen thus removed from the shell portions 183 and 184 is blown into the separating cup assemblies 20 which are carried on the separating conveyor 21 immediately below the path of movement of the cracking assemblies 18.

The egg contents separating assemblies 20, which are carried on the separating conveyor 21, move in an endless horizontal path beneath the cracking assemblies 18 and at the cracking station 17 each of the successive separating assemblies 20 is aligned beneath a cracking assembly 18 by proper relative spacing of the latter on the turret 19 and of the separating assemblies 20 on the conveyor 21 which has one end carried on the sprocket 22 secured to the shaft 15 immediately below the turret plate 91.

Each of the separating assemblies 20 (Figs. 4, 21 and 22) comprises three main portions, an upper egg receiving tray 200, a lower albumen receiving pan 201, and a bail member 202 which serves to connect the two pan-like members 200 and 201 in pivoted relation and to support the same from the chain 21 by connection with a hanger bracket 203. The upper tray portion 200 of the assembly 20, which initially receives the egg contents, includes a tray-like portion 204 which is open at the front edge and which has attached to the lower edge of forward portions of the side walls 205 thereof a yolk cup 206 of a size and shape adapted to receive the normal sized yolk of an egg. The rear end or edge of the yolk cup 206 is spaced from the forward edge of the bottom member 207 of the tray portion 204 to form a slot 208 through which the albumen may drain around the inner edge of the cup 206. The upper tray portion 204 is attached to the outer ends of the leg forming sections 209 of the supporting bail 201 by pivots 210. The pivoting of the tray portion 204 in a counter clockwise direction on the leg sections 209 is limited by an abutment stop forming member 211 projecting rearwardly of one of the side edges of the tray 204 and having its end engageable with a leg section 209.

The bottom or albumen collecting pan 201 of the separating assembly 20 is of generally triangular shape with the back wall 212 having attached thereto upstanding bearing forming members 213 which receive a pivot forming cross pin 214 extending between the leg sections 209 of the bail member 202. Relative movement between the legs 209 of the member 202 and the pan 201 is in the clockwise direction of the pan 201 and is limited by an abutment stop member 215 which extends at right angles to one of the legs 209 and is adapted to engage with the inner surface of the back wall 212 of the pan 201. The pan 201 is provided at its forward end with a forwardly projecting pin 216 for a purpose which will be described. The bail member 202 has a portion 217 bent at an angle upwardly and rearwardly of the legs 209 which is adapted to be engaged in a depending hook formation 218 on the hanger 203.

The assembly supporting hangers 203 each include an angle or base plate extension 219 at the top of the hook forming portion 218 which is secured to a link of the chain 21. A cross pin 220 extends between upstanding ears 221 on the base plate 219 and supports in pivoted relation thereon an inverted U-shaped latch element having depending legs 222 which are adapted to engage above the bight portion 217 of the member 202. A bight forming portion 223 which serves as a handle for manually swinging the latch member extends at right angles to the leg members 222 and connects the two leg members for simultaneous operation so that the bail 202 is normally held in latched relation in the hook forming portion 218 of the hanger and is readily released by manual operation of the handle forming portion 223 to swing the latching element about the pivot 220.

The separating assemblies 20 are swingable outboard of the path of travel of the supporting conveyor 21 and their movement is controlled by a series of cam rails which will be described. The one end of the conveyor 21 (Fig. 5) is supported on sprocket 22 which is secured to the vertical shaft 15 while the other end is supported on the sprocket 23 which is mounted on a stub shaft 225 on a bearing plate 226 which is slotted at 227 to receive fastening studs 228 extending upwardly of a horizontal frame support structure 229. A top plate 230 on the supporting structure 229 has its side edges upturned or flanged at 231 to provide a guide rail for holding the chain conveyor 21 in proper alignment by engagement of the top of the rail forming flange 231 beneath the hangers 203 on which the separating assemblies 20 are supported.

The separating assemblies 20 are carried around the vertical shaft 15 by the conveyor 21 and sprocket 22 in a generally outwardly extending position and in vertical alignment beneath the cracking assemblies 18 which are positioned on the turret head 19 above the same. At the point in their movement at which the separating assemblies 20 receive the egg contents from an opened up cracking assembly 18 the lower albumen tray portion 201 is supported on the end of an arcuate lower rail 232

(Figs. 2A, 3, 5 and 6) while the upper tray-like portion 200 and the attached yolk cup 206 are supported in an outwardly extending slightly upwardly inclined position by an arcuate rail 233 which is arranged in spaced relation above the rail 232 and supported therefrom by connecting bracket members 235 and 236. A guard rail 237 is preferably provided in spaced relation above the rail 233 and is supported therefrom by connecting brackets 238 and 239. The rails 232, 233 and 237 are braced by connecting brackets 240, 241 and 242 which extend from the upright post 243 forming part of the main frame 35. Each succeeding assembly 20 is held in the position in which it receives the egg contents as it travels in a circular path around the shaft 15 and receives any additional albumen which is blown from the shells by the air jet mechanism 170. As the chain 21 leaves the end supporting sprocket 22 the successive sepaarting assemblies 20 pass by an inspection station 24 (Figs. 1 and 5) at which an operator is positioned. The guard rail 237 terminates as the assemblies 20 approach the inspection station 24 and the supporting rails 232 and 233 also terminate with their ends attached to a depending bracket forming member 244. At this point the support of the separating assemblies 20 is transferred to the uppermost one of a pair of generally parallel supporting rails 245 and 246 which extend along the run of the conveyor 21 above a collection pan 247 at the inspection station 24. The rails 245 and 246 are supported one above the other at the one end by the depending bracket 244 with the bottom pan 201 of each assembly normally supported on the top rail 245 which is at a lower level than the supporting rail 233 so that the top tray portion 200 is tilted sufficiently to position the yolk in the yolk cup 206 and allow the albumen to drain over the edges thereof into the lower albument collecting pan 201, the latter being held at a substantially horizontal level.

As the separating assemblies 20 pass the inspection station 24, the operator is able to observe the condition of the contents and provision is made for dumping any one of the assemblies which is carrying an egg not in condition to be separated. By exerting pressure rearwardly on the projecting pin 216 at the forward end of the tray 201, the tray 201 may be pivoted about the pin 214 and the hanger member 203 sufficiently to allow the entire assembly to swing clear of the upper supporting rail 245 and dump the contents into the tray 247 beneath the same. If the character of the egg meats is such that it is desired to remove it entirely by a dumping operation, this can be done at a point near the end of the rails 245 and 246 by merely pushing on the pin 216 sufficiently to transfer the support of the assembly 20 from the uppermost rail 245 to the lowermost rail 246 as the assembly moves by the inspection station 24. The bottom rail 246 has an offset portion 248 (Figs. 4 to 6) at the end thereof where it is attached to a vertical support post 249 forming part of the framework of the machine. The offset portion 248 allows the assembly 20 to swing to a vertical position to dump the entire contents into a disposal tray or chute 250 positioned below the same and above the collecting tray 247. The chute 250 is, of course, connected with a suitable disposal container (not shown). A back rail 251 for guiding assemblies which are dumped has one end attached at 252 to the outer face of the shell disposal chute 163. This rail 251 terminates at 253 adjacent the end 254 of an arcuate rail 255 which guides the dumped and soiled assemblies 20 into the housing 270 for the washing machine 27 which is supported along the rear run of the conveyor 21. The assemblies 20 which are observed to be in condition for separation of the whites or albumen from the yolks are allowed to continue with the lower pan 201 supported on the upper rail 245 until the assemblies 20 pass the supporting post 249 where the rail 245 has a downwardly and inwardly curved extension 256 which allows the albumen collecting pan 201 to drop to a lower level and simultaneously tilt forwardly and downwardly to an inclined position and dump the contents into a collecting tray or chute 25 for discharge from the machine. Meanwhile, the yolk cup 206 is picked up by an upper rail section 258 which has an upper end supported by the post 249 and which extends downwardly around the end of the conveyor 21. The rail section 258 over which the cup 206 initially travels curves partially around the end of the conveyor 21 and terminates at a discharge chute 26 into which the yolk is dumped. The lower rail 256 which carries the albumen tray 201 continues past the chute 26 and has an upwardly inclined section 260 extending to the top of the casing for the washing machine 27 so that the entire assembly 20, after the separation, rides on the rail section 260 to the top of the washing machine.

The upper rail section 258 is supported from the lower rail section 256 by a connecting bracket 261. Suitable upstanding rods or posts 262 and 263 support the rail 255 and the lowermost portion of the rail 256 above a horizontally extending bracket 264 on the end of the frame 229 of the machine. The lower inner rail 255 is split as it approaches the washing machine to provide two rail sections 265 and 266 for separating the paths of the two tray portions 200 and 201 of the assemblies 20 for the washing operation. The collecting trays and chutes 247, 250, 25 and 26 are removably supported by suitable brackets or the like on the supporting frame 229 of the machine so that they may be readily removed for cleaning.

The washing apparatus 27 (Figs. 2B and 23 to 25) which is mounted in the housing 270 comprises a pair of horizontally disposed brushes 271 mounted on laterally spaced shafts 272 and 273 which are connected in driven relation to a power shaft 274. The brush shafts 272 and 273 are supported in suitable bearing members 275 at the entrance end of the housing and provided with pulleys 276 which are connected by belts 278 with a pulley 279 on the end of the drive shaft 274, the latter being supported in bearing members 280 and 281 at opposite ends of the housing 270. The guide rails 265 and 266 which guide the assemblies 20 into the housing 270 direct the upper tray portion 200 between the brushes 271 and hold the lower tray 201 against the innermost brush 271. Water or other sterilizing fluid is supplied to the brushes 271 by a perforated pipe 282 positioned above the same and supported at 283 in the outside wall 284 of the housing 270 and connected by suitable couplings 285 with a supply line for the cleaning fluid. The washing apparatus also includes nozzles 286, 287 and 288 which are positioned as shown in Fig. 25 to spray the separate portions of the separating cup assembly 20. The nozzles 286, 287 and 288 are connected by suitable pipes with the cleaning fluid supply. A control valve 289 is provided with a pivotally mounted operating arm 290 which extends into the path of movement of the assemblies 20 to turn the fluid on as the assemblies pass the nozzles 286, 287 and 288.

As the cleaned and sterilized assemblies 20 emerge from the open end of the washer housing 270, they engage with a guide rail 291 (Figs. 2A and 5) which brings them up to supporting rails 232 and 233 at the cracking station 17. Those assemblies 20 which do not go through the washing machine 27 are supported on the top of the housing 270 as they advance and pass over the washing machine and onto the rail 292 on which they move to the support rails 232 and 233 at the cracking station 17.

The vertically mounted power drive shaft 15 (Figs. 2A and 26) is supported in top and bottom bearings 293 and 294. A drive sprocket 295 is mounted on the shaft 15 adjacent the bottom bearing 294 and connected by a drive chain 296 with the output sprocket 297 of a change speed device 298. The input shaft 299 of the change speed device 298 is connected to the power shaft of a drive motor 300. A pulley 301 on the drive shaft 299 is connected by a drive belt 302 with a pulley 303 on the end of the power shaft 274 for operating the washing apparatus. The motor 300 and the change speed device 298 are mounted on a cross frame member 304 at the bottom of the machine, which also supports the bottom bearing 294 for the vertical power shaft 15.

A drip pan 305 (Figs. 2A and 3) is supported horizontally on brackets 306 between the cracking and separating mechanism and the driving connections at the bottom of drive shaft 15. A shield plate 307 is also secured above the path of the separating assemblies 20 adjacent the cracking station. A suitable container is provided for receiving the empty egg shells from the chute 163.

In operating the machine the eggs are delivered by the conveyor 10 to the feed conveyor 11 and received in the holder assemblies 16, with the eggs being supplied in rows of 6 each as they come from a conventional shipping case, and preferably with the eggs being washed and sterilized while they are on the conveyor 10. Each egg is carried by a holder 16 to the delivery station A (Fig. 11) where the holder assembly 16 is allowed to rotate about the axis of the shaft 58 when the holder arm 60 moves down the ramp 81 (Fig. 20) at the end of plate 34. The holder arm or jaw 69 engages with the cam plate 82 and opens the holder to allow the egg to drop by gravity into a cracking assembly 18 which is aligned below the feed holder assembly 16. As the holder assembly 16 passes the cam plate 82 the jaw 69 is released and the assembly is turned to its egg receiving position by engagement of the arm 60 with cam plate 86 and thereafter the arm 71 engages with cam rail 72 to open the jaw 69. The jaws of the cracking assembly 18 are opened up and the cracking knives 124 and 125 are moved to open or cocked position by engagement of the cam arms 134 and 135 with the cams 152 and 153 while the assembly 18 is advanced at station A with the assembly being held in the egg receiving position. The egg is gripped in the assembly and the shell cracked as the cam arms 134 and 135 move beyond the cams 152 and 153. The entire assembly 18 swings downwardly about the pivot 97 under the control of cam member 159 as it advances toward station C where the dumping occurs (Fig. 3) with the jaws being pivoted to the dumping position about the connecting pivot 107 by engagement of cam arm 140 with the ends 138 and 139 of jaw members 98 and 99. An empty separating assembly 20 is moved by the conveyor chain 21 into vertical alignment beneath each cracking assembly 18 at station C with the lower pan 201 supported on the lower rail 232 and the upper pan 200 supported on the upper rail 233. The upper pan 200 is positioned only a very short distance below the egg as the cracked shell portions are opened up by operation of the assembly 18 and the egg contents is delivered by gravity into the pan portion 200 so that there is a minimum of broken yolks in the operation of the mechanism. The cracking assemblies 18 and the separating assemblies 20 travel in vertical alignment around the shaft 15 and any white which clings to the shell portions is blown out by operation of the air jet assembly 170 which travels for a predetermined distance with the same. The white removed by the air jet assembly 170 is delivered to the upper pan 200 of the separating assembly 20 and subsequently separated with the white delivered by gravity. The cracking assemblies continue around shaft 15 to station H where they are swung upwardly about pivot 97 and the jaws are opened up by the cams 152 and 153 to release the empty shell portions into the chute 163.

The separating assemblies 20 with the egg contents in the upper pan 200 are advanced along the supporting rails 232 and 233 to the rail 245 where the upper pan 200 of each assembly is tilted sufficiently to move the yolk into the cup 206 and drain the white around the edge of the same into the lower pan 201. The operator at inspection station 24 observes the contents of each assembly and any broken yolks are immediately dumped into pan 247 by pushing the lower pan 201 toward the chain 21 a sufficient distance to pivot the entire assembly on the bail portion 218 and permit it to swing clear of both support rods 245 and 246. If a bloody egg is observed, the operator pushes the lower pan toward the chain 21 a sufficient distance from the pan 201 to drop the lower support rail 246 on which it rides until the assembly reaches the offset portion 248 thereof where it rides off the rail 246 and dumps the contents into the pan 250 below the same. The assemblies which carry egg meats observed to be in condition for separation are carried to the end of support rail 245 where the upper pan 200 rides on rail 258 while the lower pan 201 rides on rail 256 for dumping of the contents in the chutes 26 and 25, respectively. These assemblies then continue around to the cracking station 17 being carried over the top of the housing 270. The assemblies 20 which have been dumped at the inspection station are carried, in depending relation, to the washing machine and are directed into the housing by the split rails 265 and 266 so that they are operated on by the brushes 271 and subsequently sprayed by the nozzles 286, 287 and 288. As the cleaned and sterilized assemblies 20 emerge from the washing machine they are swung up to the station C by engagement with support rail 291 (Fig. 2A).

The separating assemblies 20 may, of course, be readily removed from the conveyor 21 when it is desired, for any reason, to replace them and a new one substituted while they are passing between the inspection station 24 and the cracking station 17.

While specific details of construction have been referred to in describing the form of the machine illustrated, other details of construction may be resorted to within the spirit of the invention.

I claim:

1. In an egg breaking machine, a turret support, an egg cracking assembly mounted in radially projecting relation on said turret support, said cracking assembly comprising two pairs of generally C-shaped egg gripping members, the gripping members of each pair being arranged in confronting relation and having end extensions which are hinged to each other so that they may swing apart to receive an egg with the long axis of the egg generally parallel with the axis of the hinged connection, spring means connected to said gripping members for urging said gripping members toward each other, said pairs of gripping members being positioned, when receiving an egg, one above the other so that the respective members of each pair are in vertical alignment hinge means connecting the inner gripping members of each pair, said hinge means having its axis at right angles to the axis of each of the hinged connections between the gripping members of each pair thereof so that each pair may swing as a unit relative to the other pair, a bracket extending from one of said inner gripping members hinge means connecting said bracket with said turret support for swinging movement about an axis parallel with the axis of the hinged connection between said inner gripping members, a cam arm extending from said bracket, cam rail members mounted in fixed position adjacent said turret support and engaging said cam arm to control the swinging movement of said cracking assembly relative to said turret support, and a cam bar on said turret support which is engageable with the uppermost pair of gripping members upon downward swinging movement of said cracking assembly to cause the pairs of gripping members to swing about their hinged connection to an open position.

2. In an egg breaking machine as claimed in claim 1, and a cracking knife pivotally mounted on said cracking assembly, spring means connected to said cracking knife and said cracking assembly for urging said cracking knife toward engagement with the shell of an egg gripped in the cracking assembly, said cracking knife having an operating arm projecting therefrom and cam members mounted adjacent the path of said turret support in position for engaging said operating arm to pivot said cracking knife to an open position and to release the same for cracking the egg shell as said turret support rotates.

3. In an egg breaking machine, an egg carrying and cracking assembly comprising two pairs of generally C-shaped egg gripping arm members, each pair of said arm members being arranged in confronting relation and being hinged to each other at one end so that they may swing toward and from each other to grip an egg with the long axis of the egg generally parallel with the axis of the hinged connection, said pairs of arm members being mounted in spaced relation one above the other so that the respective arm members of each pair are in vertical alignment when in egg receiving position, a hinged connection between corresponding arm members of each pair, said hinged connection being adjacent confronting edges of said corresponding arm members and having its axis at right angles to the axis of each of the hinge connections between the members of each pair thereof so that the members of each pair may swing about corresponding ends toward and from each other, and each pair may swing as a unit relative to the other pair about said hinged connection, a turret support for said cracking assembly, a bracket extending from one of the arm members of said cracking assembly, pivotal means connecting said bracket to the periphery of said turret support for swinging movement on a horizontal axis which is parallel with the axis of the hinged connection between the pairs of said arm members and which is spaced in a radial direction from the axis of rotation of said turret support, a cam arm extending from said bracket and cam rails mounted in fixed position and extending around the periphery of said turret, said cam rails being located so as to engage said cam arm for controlling the pivotal movement of said cracking assembly relative to said turret.

4. In an egg breaking machine as claimed in claim 3, and a supporting wire ring member pivotally connected to said turret support adjacent the means connecting said bracket to said turret support for movement to and from a position for engaging the end of an egg gripped in said cracking assembly.

5. In an egg cracking machine having an upright supporting frame, a vertically disposed support shaft rotatably mounted in said frame and means for mounting on said support shaft a plurality of egg cracking assemblies, said cracking assemblies being arranged in peripherally spaced relation around said shaft for travel in a plane which is normal to the axis of rotation of said shaft, each of said cracking assemblies having hingedly connected pairs of egg gripping jaw formations with the jaw formations of each pair thereof being hinged to each other, means on said cracking assemblies and said supporting frame which is operative to swing the jaw formations to outwardly and downwardly facing open position after the egg is cracked so as to allow the egg contents to drop from the open shell halves by gravity, an air tube having a free end with air discharge openings, means to rotatably support the air tube on said supporting shaft and cooperating means, operative after gravity discharge of the egg contents, on said mounting means and said air tube to position the free end thereof between the shell halves held in the jaw formations of successive cracking assemblies for directing air through the openings into the shell halves so as to blow out of said shell halves albumen remaining therein.

6. An egg cracking machine comprising a supporting frame, a vertical support shaft mounted in said frame, a horizontal turret mounted on said shaft and having radially extending horizontal portions, a plurality of egg cracking assemblies supported on the radially extending portions of said turret in spaced relation around the periphery of said turret, pivot means connecting each of said assemblies to the radially extending portions of said turret for swinging movement of each assembly outwardly and downwardly of its supporting arm about a horizontal axis, means on said frame and engaging said assemblies to swing said assemblies between an upper outwardly extended horizontal egg receiving position and a lower downwardly extending vertical egg dumping position, said assemblies each having two pairs of egg gripping jaws, which are engaged in spaced relation one above the other when the assembly is in a horizontal position, hinge means connecting the jaws of each pair thereof, spring means connected to said jaws to urge said jaws toward closed egg gripping relation, hinge means connecting the innermost jaws of each pair thereof to each other whereby one pair of the jaws may be swung as a unit toward and from the other pair thereof about an axis which is normal to the axis of the hinge means connecting the jaws of each pair, cam means on said frame positioned to engage said assemblies at a predetermined point in their path to hinge said egg gripping jaws to an open egg receiving position, shell cracking means mounted between said outermost jaws, spring means connected to said shell cracking means and said jaws to urge said shell cracking means into engagement with the shell of an egg held between said jaws and means on said turert and engageable with one pair of said jaws when an assembly is swung to a vertical position to swing open the pairs of jaws and discharge by gravity the contents of a cracked egg held in said gripping jaws, means mounted closely adjacent and above said turret plate for delivering successive eggs into feeding position where they are vertically aligned with successive cracking assemblies when said cracking assemblies are in the upper outwardly extending position for movement in a vertical path into said cracking assemblies and with their long axis extending vertically, egg separating assemblies, means rotatably mounted below said turert for supporting said separating assemblies in upwardly opening spaced relation closely adjacent and below said turret when said cracking assemblies are in the dumping position, said separating assemblies moving in a horizontal plane around said shaft, and means for driving said egg delivery means, said turret and the supporting means for said egg separating assemblies in timed reltaion so that the eggs move in vertical paths as they are delivered to the cracking assemblies and the contents thereof are dumped into the separating assemblies as said separating assemblies and said cracking assemblies are carried in closely spaced relation and in vertical alignment around said support shaft.

7. An egg cracking machine comprising an upright frame, a vertical shaft mounted in said frame, a traveling turret member mounted on said shaft and moving in a horizontal plane around said shaft, a plurality of egg cracking assemblies supported in spaced relation around the periphery of said turret member, pivot means connecting each of said assemblies to said turret for swinging movement outwardly and downwardly of said turret member, means mounted on said frame in the path of said assemblies for engaging said assemblies to swing said assemblies from an upper outwardly extended horizontal position to a lower downwardly extending vertical position, said assemblies each having two pairs of egg gripping jaws, which are arranged with one spaced above the other when the assembly is in a horizontal position, pivot means connecting the jaws of each pair to each other at one end thereof to permit said jaws to swing between a closed egg gripping position and an open egg releasing position, spring means connected to said jaws to urge said jaws toward closed egg gripping position, pivot means connecting the innermost jaws of each pair thereof to each other whereby one pair of the jaws may be swung toward and from the other pair thereof about an axis which is normal to the axis of the pivot means connecting the jaws of each pair, cam means on said frame for engaging cooperating means on said assemblies at a predetermined point in their path of movement to hinge said egg gripping jaws to an open position for receiving an egg, shell cracking blades pivoted on said jaws between the pairs thereof, spring means connected to said cracking blades and said jaws to urge said cracking blades into engagement with the shell of an egg held between said jaws, means on said turret and engageable with one pair of said jaws when an assembly is swung downwardly to a depending vertical position on said turret member to swing open the pairs of jaws and discharge by gravity the contents of a cracked egg held between said jaws, egg feeding means mounted on said shaft closely adjacent to and above said turret member for delivering eggs with their long axis vertical to a position in vertical alignment with successive cracking assemblies and for depositing the eggs in the cracking assemblies when said cracking assemblies are in their upper outwardly extended position, egg separating assemblies, means supporting said egg separating assemblies on said shaft closely adjacent to and below said turret member when said cracking assemblies are in their lower downwardly extending position and traveling in a horizontal plane around said shaft, and means for driving said egg delivery means, said turret member and said supporting means for said egg separating assembiles in timed relation, whereby to delivery eggs to the cracking assemblies and to align the separating assemblies vertically with said cracking assemblies for receiving the egg contents therefrom while said cracking and separating assemblies are carried in vertically aligned relation around said shaft.

8. An egg cracking machine comprising a supporting frame, a vertical support shaft mounted in said frame, a horizontally disposed rotating turret member mounted on said shaft and having radially extending horizontal arms, egg gripping and cracking assemblies carried on said arms in spaced relation around the periphery of said turret member, pivot means connecting each of said assemblies to a turret arm for swinging movement of the assembly outwardly and downwardly of said arm, means on said frame and engaging said assemblies while said assemblies are traversing a portion of their path around said shaft for swinging said assemblies from an upper outwardly extending horizontal egg receiving position to a lower downwardly extending vertical egg discharging position, said assemblies each having two pairs of egg gripping jaws, which jaws are located one above the other when the assembly is in its upper horizontal position, the jaws of each pair thereof having confronting egg engaging portions and hinge means connecting the jaws of each pair thereof to each other at one end, spring means connected to said jaws to urge said jaws toward closed egg gripping relation, hinge means connecting the innermost jaws of each pair thereof to each other whereby the two pairs of jaws may be swung toward and from each other about an axis normal to the axis of the hinged connection of the jaws of each pair, means on said frame and engaged by said assemblies to hinge said egg gripping jaws from a normally closed to an open position for receiving an egg, cracking blades pivoted on said jaws between confronting portions of the outermost jaws, spring means connected to said cracking blades and said jaws to urge said cracking blades into engagement with the shell of an egg held between said jaws so as to crack the shell thereof intermediate the ends of the egg, means on said turret member and engageable with one pair of said jaws when an assembly is swung to a lower vertical position to swing open the pairs of jaws and discharge by gravity the contents of a cracked egg held in said jaws, means mounted on said support shaft closely adjacent to and above said turret plate for delivering eggs in a downward path and with the long axis extending vertically to successive cracking assemblies, a traveling support member mounted on said support shaft closely adjacent to and below said turret plate for movement in a horizontal plane, egg separating assemblies spaced on said traveling support member in accordance with the spacing of said egg gripping and cracking assemblies and in vertical alignment with said egg gripping and cracking assemblies, said separating assemblies being closely adjacent to said cracking assemblies when said cracking assemblies are in the lower vertical egg discharging position, and means for driving said egg delivery means, said turret member and said egg separating assembly support member in timed relation whereby eggs are delivered to the cracking assemblies and the egg contents are delivered from the cracking assemblies to the separating assemblies while said cracking and separating assemblies are carried in vertical alignment around said support shaft.

9. An egg cracking machine comprising a supporting frame, a vertical power shaft rotatably mounted on said frame, power means connected to said shaft for rotating the same, a horizontal turret plate fixed on said shaft to rotate therewith, a plurality of egg cracking assemblies pivotally mounted in peripherally spaced relation on said turret plate for swinging movement in vertical paths outwardly and downwardly of the path of movement of said turret plate, said assemblies each having two pairs of egg gripping jaws, hinge means connecting the jaws of each pair thereof to each other for opening and closing movements about a common axis, hinge means connecting the two pairs of jaws for movement about an axis which is at a right angle to the axis of the hinge means connecting the jaws to each other, means on said frame and engaging with the jaws of said assemblies when said assemblies are in an upper outwardly extended position to hinge said jaws about their axis to an open position for receiving an egg with the long axis vertical, cracking means connected to each said assembly, means on said frame and said assembly which is operative to actuate said cracking means and crack the shell of an egg held between said jaws intermediate the ends of the egg, means on said frame and engaging said assemblies at a predetermined point in the path of movement of the turret plate to swing said assemblies from an upper egg receiving position outwardly and downwardly of said turret plate to a lower depending contents dumping position, means on said turret plate engaging one of said jaws when an assembly is swung to the lower position to swing said pairs of jaws about their axis thereby to open the egg shell and discharge by gravity the egg contents therefrom, a horizontal sprocket fixed on said vertical shaft closely adjacent to and below said turret plate, an endless chain conveyor having one end carried on said sprocket, egg separating assemblies mounted on said conveyor in upwardly opening spaced relation, the spacing of said separating assemblies corresponding to the spacing of said egg cracking assemblies on said turret plate and said separating assemblies being in vertical alignment with the cracking assemblies as they pass around the end of said conveyor which is carried on said sprocket and being located closely adjacent to and below said cracking assemblies so that the egg contents drops only a short distance from the cracking assembly into the separating assembly.

10. An egg cracking machine as recited in claim 9, and an air device rotatably mounted on said power shaft and having a nozzle carrying end extending into the path of movement of said cracking assemblies, said device being movable to position the nozzle between the open jaws of a cracking assembly when said cracking assembly is swung to said lower egg contents discharging position, and means to connect said air device to said power shaft for travel with said shaft during a predetermined portion of each rotation of said shaft so as to position the nozzle between the open jaws of successive cracking assemblies when they are in said lower position and after the contents has been discharged from the shell portions.

11. An egg cracking machine comprising an upright supporting frame, a vertically disposed power shaft rotatably mounted on said frame, a horizontal turret plate fixed on said shaft to rotate therewith in a horizontal plane, a plurality of egg cracking assemblies pivotally mounted in peripherally spaced relation on said turret plate for swinging movement in vertical paths outwardly and downwardly of the path of movement of said turret plate, said assemblies each having two pairs of egg gripping jaw formations which are hingedly connected on a horizontal pivot for opening and closing movements, the jaw formations of each pair being hingedly connected to each other for movement on a common vertical axis when the assembly is in an upper outwardly extended horizontal position, means on said frame and engaging with said assemblies when said assemblies are in said upper horizontal position to hinge the gripping jaw formations about their axis to an open position for receiving and gripping an egg with the long axis vertical, shell cracking means connected to each said assembly, means on said frame and said assembly which is operative to actuate said shell cracking means and crack the shell of the egg intermediate the ends of the egg while it is held between said jaw formations, means on said frame and engaging said assemblies to swing said assemblies from an upper outwardly extended, horizontal egg receiving position to a lower downwardly extending contents dumping position, means on said turret plate and engaging said assemblies when said assemblies are in lower downwardly extending position to swing said pairs of jaw formations about their axis to open the cracked shell portions for discharge by gravity of the egg contents therefrom, a horizontal sprocket fixed on said vertical shaft closely adjacent to and below said turret plate, an endless chain conveyor having one end carried on said sprocket, and upwardly opening egg separating assemblies mounted on said conveyor and spaced so that successive separating assemblies are each in vertical alignment with a cracking assembly on said turret as they pass around the end of said conveyor which is carried on said sprocket, said egg separating assemblies being positioned vertically relative to the cracking assemblies so that the cracking assemblies are opened immediately above the open tops of said separating assemblies and the egg contents drops a very short distance as it is discharged by gravity into a separating assembly.

12. An egg cracking machine comprising a rotatably mounted vertically disposed power shaft, a turret plate secured on said shaft, a plurality of egg cracking assemblies pivotally mounted in spaced relation around the periphery of said turret plate for swinging movement from an upper horizontal position outwardly of the path of movement of said turret plate to a lower depending position, said assemblies each having pairs of egg gripping jaw formations, means hingedly connecting the jaw formations of each pair thereof, means hingedly connecting the two pairs of jaw formations for opening and closing movements about an axis which is at right angles to the hinge means connecting the jaw formations of each pair thereof, means hinged to the jaw formations to crack the shell intermediate the ends of an egg while it is held by said jaw formations, means mounted at a fixed point adjacent said shaft for engaging each said assembly which is operative to swing said assembly about its pivotal mounting from said upper position where an egg is received with its long axis vertical to said lower position where the long axis of the egg is horizontal, means on said turret plate positioned to engage with said jaw formations when said assembly is swung to said lower position and to swing said jaw formations to open up the cracked shell portions for discharge by gravity of the egg contents therefrom, an egg separating conveyor including an endless conveyor member having one end carried on a sprocket secured on said power shaft adjacent to and below said turret plate, egg separating assemblies secured on said endless conveyor member in spaced relation so as to align vertically with the cracking assemblies on said turret plate as the separating assemblies and the cracking assemblies advance around the power shaft, a radially extending angular air tube rotatably mounted at its inner end on said power shaft below said turret plate with the outer end thereof projecting upwardly in a path extending between the opened up shell portions in the cracking assemblies when the cracking assemblies are in said lower position, said air tube having perforations in its outer end for directing a stream of air into said shell portions when it is positioned between said shell portions to remove the albumen for delivery to a separating assembly below the same, and means connecting said air tube to said turret plate so as to position the perforated end thereof between the shell portions in successive cracking assemblies after the discharge of the egg contents therefrom, said connecting means being operative to cause said air tube to advance with said cracking assemblies during a predetermined portion of the movement thereof about said shaft.

13. An egg cracking machine comprising rotatably mounted vertical power shaft, a turret plate secured on said shaft, a plurality of peripherally spaced egg cracking assemblies pivotally mounted on said turret plate for swinging movement outwardly and downwardly of the path of movement thereof, said assemblies each having four egg gripping jaw formations which are arranged in one position in egg encompassing paired relation and which are hingedly connected at one of their ends in pairs for opening and closing movements about aligned axes, the hinged pairs of said jaw formations being hingedly connected to open at right angles to the hinging movement of the jaws of each pair thereof, means mounted adjacent the periphery of said turret plate to hinge said egg gripping jaw formations about their connecting axis to an upper open position for receiving an egg with the long axis thereof positioned vertical, means on each said assembly which is operated to crack the shell of the egg while it is held by said jaw formations so as to divide the shell into two halves, means mounted at a fixed point adjacent the periphery of said turret plate to engage said assembly and swing said assembly about its pivotal mounting to a lower position where the long axis of the egg is generally horizontal, means on said turret plate for engaging said assembly when said assembly is swung to said lower position to swing said pairs of jaw formations about their hinge connection so as to open up the cracked shell portions for discharge by gravity of the egg contents therefrom, an egg separating conveyor comprising an endless chain mounted on a supporting sprocket which is secured on said power shaft adjacent to and below said turret plate, egg separating assemblies mounted on said conveyor chain and spaced to align vertically with said cracking assemblies to receive the egg contents from the cracking assemblies as said cracking and separating assemblies pass around said power shaft, a radially extending bent tube having its inner end rotatably supported on said power shaft between said turret plate and said sprocket, said tube having its outer end extending upwardly and being perforated, means connecting said tube to said shaft for rotating said tube with the perforated end thereof between the opened up jaws of successive cracking assemblies, after the discharge of the egg contents therefrom, for a predetermined portion of their travel around said power shaft and with the perforated end positioned to direct a stream of air into each of the open shell portions carried thereby and means to supply air to said tube while it is rotated with said assemblies.

14. An egg cracking machine as recited in claim 13 wherein the means for connecting said tube to said shaft comprises cooperating members connected to said turret plate and said tube which interengage to advance the tube a predetermined distance with each cracking assembly, means to automatically disengage said members and release the tube, and means to reverse the rotational movement of the tube so as to position the same for advance with the succeeding cracking assembly.

15. An egg cracking machine comprising a rotatably mounted vertical power shaft, a turret plate secured thereon for rotation therewith, a plurality of peripherally spaced egg cracking assemblies pivotally mounted on the periphery of said turret plate for swinging movement outwardly and downwardly of the path of movement thereof, said assemblies each having egg gripping jaw formations, means connecting said jaw formations in paired relation for opening and closing movements about axes which are in alignment with each other, means hingedly connecting corresponding jaw formations of each pair thereof for hinging movement of the pairs as units, means mounted at a fixed point adjacent the path of movement of said assemblies to engage said egg gripping jaw formations when said assemblies are in an upper outwardly extending position and hinge said jaw formations about their aligned axis to an open position for receiving an egg with the long axis vertical, means on said jaw formations which is operative to crack the shell of the egg intermediate the ends of the egg while it is held by said jaw formations so as to divide the shell into two portions, means mounted at a fixed point adjacent said turret plate to engage each said assembly and swing said assembly about its pivotal mounting to a lower downwardly extending position where the long axis of the egg is generally horizontal, means for engaging one of said pairs of jaw formations of said assembly when said assembly is swung to the lower position which is operative to swing the pairs of said jaw formations to open position for discharge of the egg contents from the shell portions, an egg separating conveyor having end supporting sprockets, one of said sprockets being secured on said power shaft adjacent to and below said turret plate, and egg separating assemblies arranged on said conveyor and spaced so as to align vertically with the cracking assemblies on said turret plate as said separating and cracking assemblies rotate around the power shaft, said separating and cracking assemblies being closely adjacent each other when said cracking assemblies are in said lower egg discharging position.

References Cited in the file of this patent

UNITED STATES PATENTS

| | | |
|---|---|---|
| 894,106 | Beel | July 21, 1908 |
| 1,199,114 | Robertson | Sept. 26, 1916 |
| 1,870,741 | Nastrom | Aug. 9, 1932 |
| 1,945,788 | Pilley | Feb. 6, 1934 |
| 2,314,741 | Sigler | Mar. 23, 1943 |
| 2,371,783 | Sneed | Mar. 20, 1945 |
| 2,417,823 | Hodson | Mar. 25, 1947 |
| 2,443,188 | Hodson | June 15, 1948 |
| 2,632,490 | Frieberg | Mar. 24, 1953 |
| 2,646,163 | Sigler | July 21, 1953 |
| 2,690,837 | Gill | Oct. 4, 1954 |
| 2,723,695 | Willsey | Nov. 15, 1955 |
| 2,760,536 | Willsey | Aug. 28, 1956 |
| 2,760,537 | Willsey | Aug. 28, 1956 |
| 2,771,926 | Willsey | Nov. 27, 1956 |

UNITED STATES PATENT OFFICE
CERTIFICATION OF CORRECTION

Patent No. 2,966,184            December 27, 1960

Charles H. Willsey

It is hereby certified that error appears in the above numbered patent requiring correction and that the said Letters Patent should read as corrected below.

Column 2, line 29, for "tothe" read -- to the --; column 8, line 13, for "mountnig" read -- mounting --; column 13, line 17, for "sepaarting" read -- separating --; line 35, for "albument" read -- albumen --; column 16, line 9, for "from" read -- for --; column 18, line 48, for "reltaion" read -- relation --; column 19, line 31, for "assembiles" read -- assemblies --; line 32, for "delivery" read -- deliver --; column 22, line 26, after "comprising" insert -- a --.

Signed and sealed this 13th day of June 1961.

(SEAL)
Attest:

ERNEST W. SWIDER
Attesting Officer

DAVID L. LADD
Commissioner of Patents